US012496332B2

(12) United States Patent
Choi et al.

(10) Patent No.: US 12,496,332 B2
(45) Date of Patent: Dec. 16, 2025

(54) COMPOSITION FOR PREVENTING, TREATING, OR AMELIORATING VIRAL INFECTION DISEASE, CONTAINING A COMPLEX OF ENDOPLASMIC RETICULUM (ER) STRESS INHIBITOR AND REACTIVE OXYGEN SPECIES SCAVENGER AS ACTIVE INGREDIENTS

(71) Applicant: Korea University Research and Business Foundation, Seoul (KR)

(72) Inventors: Sang-Yun Choi, Seoul (KR); Kwang-Il Jung, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 845 days.

(21) Appl. No.: 17/628,811

(22) PCT Filed: Jun. 29, 2020

(86) PCT No.: PCT/KR2020/008466

§ 371 (c)(1),
(2) Date: May 24, 2022

(87) PCT Pub. No.: WO2021/015437

PCT Pub. Date: Jan. 28, 2021

(65) Prior Publication Data

US 2022/0323551 A1 Oct. 13, 2022

(30) Foreign Application Priority Data

Jul. 22, 2019 (KR) ........................ 10-2019-0088151
Sep. 6, 2019 (KR) ........................ 10-2019-0110873

(51) Int. Cl.

| | |
|---|---|
| ***A61K 38/44*** | (2006.01) |
| ***A61K 9/00*** | (2006.01) |
| ***A61K 31/05*** | (2006.01) |
| ***A61K 31/085*** | (2006.01) |
| ***A61K 31/192*** | (2006.01) |
| ***A61K 31/198*** | (2006.01) |
| ***A61K 31/355*** | (2006.01) |
| ***A61K 31/375*** | (2006.01) |
| ***A61K 31/4706*** | (2006.01) |
| ***A61K 31/575*** | (2006.01) |
| ***A61P 31/16*** | (2006.01) |

(52) U.S. Cl.

CPC .......... *A61K 38/446* (2013.01); *A61K 9/0043* (2013.01); *A61K 31/05* (2013.01); *A61K 31/085* (2013.01); *A61K 31/192* (2013.01); *A61K 31/198* (2013.01); *A61K 31/355* (2013.01); *A61K 31/375* (2013.01); *A61K 31/4706* (2013.01); *A61K 31/575* (2013.01); *A61P 31/16* (2018.01); *C12Y 115/01001* (2013.01)

(58) Field of Classification Search

CPC .. A61K 38/446; A61K 9/0043; A61K 31/085; A61K 31/192; A61K 31/198; A61K 31/355; A61K 31/375; A61K 31/4706; A61K 31/575; A61K 31/05; A61P 31/16; A61P 31/14; C12Y 115/01001; A23K 20/111; A23K 20/142; A23L 33/10

See application file for complete search history.

(56) References Cited

U.S. PATENT DOCUMENTS

| | | | |
|---|---|---|---|
| 2013/0052154 | A1 | 2/2013 | Kabanov et al. |
| 2014/0155358 | A1 | 6/2014 | Raqib et al. |

FOREIGN PATENT DOCUMENTS

| | | | |
|---|---|---|---|
| KR | 10-2009-0048403 | A | 5/2009 |
| KR | 10-1374241 | B1 | 3/2014 |
| KR | 10-2014-0099749 | A | 8/2014 |
| KR | 10-1435951 | B1 | 9/2014 |
| KR | 10-2015-0085146 | A | 7/2015 |

OTHER PUBLICATIONS

Jung et al., Free Radical Biology and Medicine, 2019, vol. 135, p. 293-305, Available online Mar. 21, 2019. (Year: 2019).*

Vlahos et al., Trends in Pharmacological Sciences, Jan. 2012, vol. 33, No. 1, p. 3-8. (Year: 2012).*

He, B., Cell Death and Differentiation (2006) 13, 393-403. doi:10.1038/sj.cdd.4401833; published online Jan. 6, 2006. (Year: 2006).*

Li et al., Crit Rev Microbiol, 2015; 41(2): 150-164. DOI: 10.3109/1040841X.2013.813899. (Year: 2015).*

Roy A, Ghosh A, Jana A, Liu X, Brahmachari S, et al. (2012) Sodium Phenylbutyrate Controls Neuroinflammatory and Antioxidant Activities and Protects Dopaminergic Neurons in Mouse Models of Parkinson's Disease. PLoS ONE 7(6): e38113. doi: 10.1371/journal.pone.003811 (Year: 2012).*

Ungheri et al., Int J Immunopathol Pharmacol. Sep.-Dec. 2000;13(3):123-128. PMID: 12657201, Abstract Only. (Year: 2000).*

Xian Lin, et al., "The Influenza Virus H5N1 Infection Can Induce ROS Production for Viral Replication and Host Cell Death in A549 Cells Modulated by Human Cu/Zn Superoxide Dismutase (SOD1) Overexpression", Viruses, 2016, pp. 1-16, vol. 8, No. 13.

(Continued)

*Primary Examiner* — Kade Ariani

(74) *Attorney, Agent, or Firm* — Sughrue Mion, PLLC

(57) ABSTRACT

Disclosed is a composition for preventing, treating or ameliorating a viral infection disease, which is safe for human application since the safety of an ER stress inhibitor and a reactive oxygen species scavenger has already been verified. The disclosure utilizes inversely the mechanism of viruses which induces oxidative damage of a host cell and then activates viral replication and infection. Although not having direct specificity to a specific virus like existing vaccines, the composition can effectively inhibit proliferation of all viruses including oxidative stress, regardless of virus type or mutations. It can be applied as a sub-universal infection inhibitor and therapeutic agent as a limited alternative to vaccines that must be newly developed each year due to emergence of new viruses or viral mutations, and is expected to be used as a preventive agent or auxiliary agent to prevent epidemics.

5 Claims, 9 Drawing Sheets

Specification includes a Sequence Listing.

(56) References Cited

OTHER PUBLICATIONS

Janina Geiler, et al., "N-acetyl-L-cysteine (NAC) inhibits virus replication and expression of pro-inflammatory molecules in A549 cells infected with highly pathogenic H5N1 influenza A virus", Biochemical Pharmacology, 2010, 413-420, vol. 79.
Alice C-H Chen, et al., "Oxidative and endoplasmic reticulum stress in respiratory disease", Clinical & Translational Immunology, 2018, pp. 1-13, vol. 7, No. e1019.
Kwang Il Jung, et al., "Influenza A virus-induced autophagy contributes to enhancement of virus infectivity by SOD1 downregulation in alveolar epithelial cells", Biochemical and Biophysical Research Communications, 2018, pp. 960-966, vol. 498.
Rong Ma, et al., "HIV Tat-Mediated Induction of Human Brain Microvascular Endothelial Cell Apoptosis Involves Endoplasmic Reticulum Stress and Mitochondrial Dysfunction", Mol Neurobiol, 2016, pp. 132-142, vol. 53.
Kwang Il Jung, et al., "Endoplasmic reticulum-associated degradation potentiates the infectivity of influenza A virus by regulating the host redox state", Free Radical Biology and Medicine, 2019, pp. 293-305, vol. 135.
Henry Nicholls, "Pandemic Influenza: The Inside Story", https://doi.org/10.1371/journal.pbio.0040050, Feb. 14, 2006, pp. 1-5.
International Search Report for PCT/KR2020/008466 dated Oct. 19, 2020 [PCT/ISA/210].
Written Opinion for PCT/KR2020/008466 dated Oct. 19, 2020 [PCT/ISA/237].

* cited by examiner

A

B

C

A

B

A

B

SEQUENCE LISTING

```
<160> NUMBER OF SEQ ID NOS: 12

<210> SEQ ID NO 1
<211> LENGTH: 2280
<212> TYPE: DNA
<213> ORGANISM: Artificial Sequence
<220> FEATURE:
<223> OTHER INFORMATION: A/WSN/1933 genome segments cDNA
      sequence_Segment 1 PB2 GenBank: LC333182.1

<400> SEQUENCE: 1

atggaaagaa taaaagaact aaggaatcta atgtcgcagt ctcgcactcg cgagatactc     60

acaaaaacca ccgtggacca tatggccata atcaagaagt acacatcagg aagacaggag    120

aagaacccag cacttaggat gaaatggatg atggcaatga aatatccaat tacagcagac    180

aagaggataa cggaaatgat tcctgagaga aatgagcagg gacaaacttt atggagtaaa    240

atgaatgacg ccggatcaga ccgagtgatg gtatcacctc tggctgtgac atggtggaat    300

aggaatggac cagtgacaag tacagttcat tatccaaaaa tctacaaaac ttattttgaa    360

aaagtcgaaa ggttaaaaca tggaaccttt ggccctgtcc attttagaaa ccaagtcaaa    420

atacgtcgaa gagttgacat aaatcctggt catgcagatc tcagtgccaa agaggcacag    480

gatgtaatca tggaagttgt tttccctaac gaagtgggag ccaggatact aacatcggaa    540

tcgcaactaa cgacaaccaa agagaagaaa gaagaactcc agggttgcaa aatttctcct    600

ctgatggtgg catacatgtt ggagagagaa ctggtccgca aaacgagatt cctcccagtg    660

gctggtggaa caagcagtgt gtacattgaa gtgttgcatt tgacccaagg aacatgctgg    720

gaacagatgt acactccagg aggggaggcg aggaatgatg atgttgatca aagcttaatt    780

attgctgcta gaaacatagt aagaagagcc acagtatcag cagatccact agcatcttta    840

ttggagatgt gccacagcac gcagattggt ggaataagga tggtaaacat ccttaggcag    900

aacccaacag aagagcaagc cgtggatatt tgcaaggctg caatgggact gagaattagc    960

tcatccttca gttttggtgg attcacattt aagagaacaa gcggatcatc agtcaagaga   1020

gaggaagagg tgcttacggg caatcttcag acattgaaga taagagtgca tgagggatat   1080

gaagagttca caatggttgg gagaagagca acagctatac tcagaaaagc aaccaggaga   1140

ttgattcagc tgatagtgag tgggagagac gaacagtcga ttgccgaagc aataattgtg   1200

gccatggtat tttcacaaga ggattgtatg ataaaagcag ttagaggtga cctgaatttc   1260

gtcaataggg cgaatcagcg attgaatccc atgcaccaac ttttgagaca ttttcagaag   1320

gatgcaaagg tgctctttca aaattgggga attgaatcca tcgacaatgt gatgggaatg   1380
```

```
atcgggatat tgcccgacat gactccaagc accgagatgt caatgagagg agtgagaatc   1440

agcaaaatgg gggtagatga gtattccagc gcggagaaga tagtggtgag cattgaccgt   1500

tttttgagag ttagggacca acgtgggaat gtactactgt ctcccgagga gatcagtgaa   1560

acacagggaa cagagaaact gacaataact tactcatcgt caatgatgtg ggagattaat   1620

ggtcctgaat cagtgttggt caatacctat cagtggatca tcagaaactg ggaaactgtt   1680

aaaattcagt ggtcccagaa tcctacaatg ctgtacaata aaatggaatt tgagccattt   1740

cagtctttag ttccaaaggc cgttagaggc caatacagtg ggtttgtgag aactctgttc   1800

caacaaatga gggatgtgct tgggacattt gataccgctc agataataaa acttcttccc   1860

ttcgcagccg ctccaccaaa gcaaagtaga acgcagttct cctcattgac tataaatgtg   1920

aggggatcag gaatgagaat acttgtaagg ggcaattctc cagtattcaa ctacaacaag   1980

accactaaaa gactcacagt tctcggaaag gatgctggcc ctttaactga agacccagat   2040

gaaggcacag ctggagttga gtccgcagtt ctgagaggat tcctcattct gggcaaagaa   2100

gacaggagat atggaccagc attaagcata aatgaactga gcaaccttgc gaaaggagag   2160

aaggctaatg tgctaattgg gcaaggagac gtggtgttgg taatgaaacg gaaacggaac   2220

tctagcatac ttactgacag ccagacagcg accaaaagaa ttcggatggc catcaattag   2280
```

```
<210> SEQ ID NO 2
<211> LENGTH: 2274
<212> TYPE: DNA
<213> ORGANISM: Artificial Sequence
<220> FEATURE:
<223> OTHER INFORMATION: A/WSN/1933 genome segments cDNA
      sequence_Segment 2 PB1 GenBank: LC333183.1

<400> SEQUENCE: 2

atggatgtca atccgacttt acttttctta aaagtgccag cacaaaatgc tataagcaca     60

actttccctt atactggaga ccctccttac agccatggga caggaacagg atacaccatg    120

gatactgtca acaggacaca tcagtactca gaaaggggaa gatggacaac aaacaccgaa    180

actggagcac cgcaactcaa cccgattgat gggccactgc cagaagacaa tgaaccaagt    240

ggttatgccc aaacagattg tgtattggaa gcaatggcct tccttgagga atcccatcct    300

ggtatctttg agacctcgtg tcttgaaacg atggaggttg ttcagcaaac acgagtggac    360

aagctgacac aaggccgaca gacctatgac tggactctaa ataggaacca gcctgctgca    420

acagcattgg ccaacacaat agaagtgttc agatcaaatg gcctcacggc caatgaatct    480

ggaaggctca tagacttcct taaggatgta atggagtcaa tgaacaaaga agaaatggag    540

atcacaactc attttcagag aaagagacga gtgagagaca atatgactaa gaaaatggtg    600

acacagagaa caataggtaa aaggaagcag agattgaaca aaaggagtta tctaattagg    660

gcattaaccc tgaacacaat gaccaaagat gctgagagag ggaagctaaa acggagagca    720

attgcaaccc cagggatgca aataaggggg tttgtatact ttgttgagac actagcaagg    780

agtatatgtg agaaacttga acaatcagga ttgccagttg gaggcaatga gaagaaagca    840

aagttggcaa atgttgtaag gaagatgatg accaattctc aggacactga aatttctttc    900

accatcactg gagataacac caaatggaac gaaaatcaga accctcggat gtttttggcc    960

atgatcacat atataaccag aaatcagccc gaatggttca gaaatgttct aagtattgct   1020

ccaataatgt tctcaaacaa aatggcgaga ctgggaaagg ggtacatgtt tgagagcaag   1080

agtatgaaaa ttagaactca aatacctgca gaaatgctag caagcatcga tttgaaatac   1140
```

```
ttcaatgatt caactagaaa gaagattgaa aaaatccggc cgctcttaat agatgggact   1200

gcatcattga gccctggaat gatgatgggc atgttcaata tgttaagtac tgtattaggc   1260

gtctccatcc tgaatcttgg acaaaagaga cacaccaaga ctacttactg gtgggatggt   1320

cttcaatctt ctgatgattt tgctctgatt gtgaatgcac ccaatcatga agggattcaa   1380

gccggagtca acaggtttta tcgaacctgt aagctacttg gaattaatat gagcaagaaa   1440

aagtcttaca taaacagaac aggtacattt gaattcacaa gtttttttcta tcgttatggg   1500

tttgttgcca atttcagcat ggagcttccc agctttgggg tgtctgggat caacgagtct   1560

gcggacatga gtattggagt tactgtcatc aaaaacaata tgataaacaa tgatcttggt   1620

ccagcaaccg ctcaaatggc ccttcagctg ttcatcaaag attacaggta cacgtaccgg   1680

tgccatagag gtgacacaca aatacaaacc cgaagatcat ttgaaataaa gaaactgtgg   1740

gagcaaaccc attccaaagc tggactgctg gtctccgacg gaggcccaaa tttatacaac   1800

attagaaatc tccacattcc tgaagtctgc ttgaaatggg aattaatgga tgaggattac   1860

caggggcgtt tatgcaaccc actgaaccca tttgtcaacc ataaagacat tgaatcagtg   1920

aacaatgcag tgataatgcc agcacatggt ccagccaaaa acatggagta tgatgctgtt   1980

gcaacaacac actcctggat ccccaaaaga aatcgatcca tcttgaatac aagccaaaga   2040

ggaatacttg aagatgaaca aatgtaccaa aagtgctgca acttatttga aaaattcttc   2100

cccagcagtt catacagaag accagtcggg atatccagta tggtggaggc tatggtttcc   2160

agagcccgaa ttgatgcacg aattgatttc gaatctggaa ggataaagaa agaggagttc   2220

actgagatca tgaagatctg ttccaccatt gaagagctca gacggcaaaa atag         2274
```

<210> SEQ ID NO 3
<211> LENGTH: 2151
<212> TYPE: DNA
<213> ORGANISM: Artificial Sequence
<220> FEATURE:
<223> OTHER INFORMATION: A/WSN/1933 genome segments cDNA
      sequence_Segment 2 PA GenBank: LC333184.1

<400> SEQUENCE: 3

```
atggaagatt ttgtgcgaca atgcttcaat ccgatgattg tcgagcttgc ggaaaaggca     60

atgaaagagt atggagagga cctgaaaatc gaaacaaaca aatttgcagc aatatgcact    120

cacttggaag tgtgcttcat gtattcagat tttcacttca tcgatgagca aggcgagtca    180

atagtcgtag aacttggcga tccaaatgca cttttgaagc acagatttga aataatcgag    240

ggaagagatc gcacaatagc ctggacagta ataaacagta tttgcaacac tacaggggct    300

gagaaaccaa agtttctacc agatttgtat gattacaaga agaatagatt catcgaaatt    360

ggagtaacaa ggagagaagt tcacatatac tatctggaaa aggccaataa aattaaatct    420

gagaagacac acatccacat tttctcattc actggggagg aaatggccac aaaggccgac    480

tacactctcg atgaagaaag cagggctagg atcaaaacca ggctattcac cataagacaa    540

gaaatggcta gcagaggcct ctgggattcc tttcgtcagt ccgagagagg cgaagagaca    600

attgaagaaa gatttgaaat cacaggaaca atgcgcaagc ttgccgacca aagtctcccg    660

ccaaacttct ccagccttga aaaatttaga gcctatgtgg atggattcga accgaacggc    720

tacattgagg gcaagctttc tcaaatgtcc aaagaagtaa atgctagaat tgaacctttt    780

ttgaaatcaa caccacgacc acttagactt ccggatgggc ctccctgttc tcagcggtcc    840

aaattcctgc tgatggatgc cttaaaatta agcattgagg acccaagtca tgagggagag    900
```

```
gggataccgc tatatgatgc aatcaaatgc atgagaacat tctttggatg gaaggaaccc    960

aatgttgtta aaccacacga aaagggaata aatccaaatt atcttctgtc atggaagcaa   1020

gtactggcag aactgcagga cattgagaat gaggagaaaa ttccaaggac taaaaatatg   1080

aagaaaacga gtcagttaaa gtgggcactt ggtgagaaca tggcaccaga aaaggtagac   1140

tttgacgatt gtaaagatgt aggcgatttg aagcaatatg atagtgatga accagaattg   1200

aggtcgcttg caagttggat tcagaatgag ttcaacaagg catgtgaact gaccgattca   1260

agctggatag agctcgatga gattggagaa gatgcggctc caattgaaca cattgcaagc   1320

atgagaagga attatttcac agcagaggtg tctcattgca gagccacaga atacataatg   1380

aagggggtgt acatcaatac tgccttgctt aatgcatcct gtgcagcaat ggatgatttc   1440

caattaattc caatgataag caagtgtaga actaaggagg gaaggcgaaa gaccaatttg   1500

tacggtttca tcataaaagg aagatcccac ttaaggaatg acaccgatgt ggtaaacttt   1560

gtgagcatgg agttttccct cactgaccca agacttgaac cacacaaatg ggagaagtac   1620

tgtgttcttg aggtaggaga tatgcttcta agaagtgcca taggccatgt gtcaaggcct   1680

atgttcttgt atgtgaggac aaatggaacc tcaaaaatta aaatgaaatg gggggatggaa  1740

atgaggcgtt gcctccttca gtcacttcaa caaatcgaga gtatgattga agctgagtcc   1800

tctgtcaagg agaaagacat gaccaaagag ttctttgaaa acaaatcaga aacatggccc   1860

gttggagagt cccccaaagg agtggaggaa ggttccattg ggaaggtctg cagaacttta   1920

ttggcaaagt cggtattcaa cagcttgtat gcatctccac aactagaagg attttcagct   1980

gaatcaagaa aactgcttct tatcgttcag gctcttaggg acaacctgga acctgggacc   2040

tttgatcttg gggggctata tgaagcaatt gaggagtgcc tgattaatga tccctgggtt   2100

ttgcttaatg cttcttggtt caactccttc ctcacacatg cattgagata g            2151
```

<210> SEQ ID NO 4
<211> LENGTH: 1698
<212> TYPE: DNA
<213> ORGANISM: Artificial Sequence
<220> FEATURE:
<223> OTHER INFORMATION: A/WSN/1933 genome segments cDNA sequence_Segment 4 HA GenBank: LC333185.1

<400> SEQUENCE: 4

```
atgaaggcaa aactactggt cctgttatat gcatttgtag ctacagatgc agacacaata     60

tgtataggct accatgcgaa caactcaacc gacactgttg acacaatact cgagaagaat    120

gtggcagtga cacattctgt taacctgctc gaagacagcc acaacgggaa actatgtaaa    180

ttaaaaggaa tagccccact acaattgggg aaatgtaaca tcaccggatg gctcttggga    240

aatccagaat gcgactcact gcttccagcg agatcatggt cctacattgt agaaacacca    300

aactctgaga atggagcatg ttatccagga gatctcatcg actatgagga actgagggag    360

caattgagct cagtatcatc attagaaaga ttcgaaatat ttcccaagga aagttcatgg    420

cccaaccaca cattcaacgg agtaacagta tcatgctccc ataggggaaa aagcagtttt    480

tacagaaatt tgctatggct gacgaagaag gggggattcat acccaaagct gaccaattcc   540

tatgtgaaca ataaagggaa agaagtcctt gtactatggg gtgttcatca cccgtctagc    600

agtgatgagc aacagagtct ctatagtaat ggaaatgctt atgtctctgt agcgtcttca    660

aattataaca ggagattcac ccccggaaata gctgcaaggc ccaaagtaag agatcaacat   720

gggaggatga actattactg gaccttgcta gaacccggag acacaataat atttgaggca    780
```

```
actggtaatc taatagcacc atggtatgct ttcgcactga gtagagggtt tgagtccggc    840

atcatcacct caaacgcgtc aatgcatgag tgtaacacga agtgtcaaac accccaggga    900

gctataaaca gcaatctccc tttccagaat atacacccag tcacaatagg agagtgccca    960

aaatatgtca ggagtaccaa attgaggatg gttacaggac taagaaacat cccatccatt   1020

caatacagag gtctatttgg agccattgct ggttttattg aggggggatg gactggaatg   1080

atagatggat ggtatggtta tcatcatcag aatgaacagg gatcaggcta tgcagcggat   1140

caaaaaagca cacaaaatgc cattaacggg attacaaaca aggtgaactc tgttatcgag   1200

aaaatgaaca ctcaattcac agctgtgggt aaagaattca acaacttaga aaaaaggatg   1260

gaaaatttaa ataaaaaagt tgatgatggg tttctggaca tttggacata taatgcagaa   1320

ttgttagttc tactggaaaa tgaaaggact ttggatttcc atgacttaaa tgtgaagaat   1380

ctgtacgaga aagtaaaaag ccaattaaag aataatgcca aagaaatcgg aaatgggtgt   1440

tttgagttct accacaagtg tgacaatgaa tgcatggaaa gtgtaagaaa tgggacttat   1500

gattatccaa aatattcaga agaatcaaag ttgaacaggg aaaagataga tggagtgaaa   1560

ttggaatcaa tgggggtgta tcagattctg gcgatctact caactgtcgc cagttcactg   1620

gtgcttttgg tctccctggg ggcaatcagt ttctggatgt gttctaatgg gtctttgcag   1680

tgcagaatat gcatctga                                                 1698
```

```
<210> SEQ ID NO 5
<211> LENGTH: 1497
<212> TYPE: DNA
<213> ORGANISM: Artificial Sequence
<220> FEATURE:
<223> OTHER INFORMATION: A/WSN/1933 genome segments cDNA
      sequence_Segment 5 NP GenBank: LC333186.1

<400> SEQUENCE: 5

atggcgacca aaggcaccaa acgatcttac gaacagatgg agactgatgg agaacgccag     60

aatgccactg aaatcagagc atctgtcgga aaaatgattg atggaattgg acgattctac    120

atccaaatgt gcaccgaact taaactcagt gattatgagg gacggctgat tcagaacagc    180

ttaacaatag agagaatggt gctctctgct tttgacgaga ggaggaataa atatctagaa    240

gaacatccca gtgcggggaa agatcctaag aaaactggag gacctatata caggagagta    300

gatggaaagt ggaggagaga actcatcctt tatgacaaag aagaaataag acgaatctgg    360

cgccaagcta ataatggtga cgatgcaacg gctggtctga ctcacatgat gatctggcac    420

tccaatttga atgatgcaac ttaccagagg acaagagctc ttgttcgcac aggaatggat    480

cccaggatgt gctcactgat gcagggttca accctcccta ggaggtctgg ggccgcaggt    540

gctgcagtca aaggagttgg aacaatggtg atggaattga tcagaatgat caaacgtggg    600

atcaatgatc ggaacttctg gaggggtgag aatggacgga gaacaaggat tgcttatgaa    660

agaatgtgca acattctcaa agggaaattt caaacagctg cacaaagaac aatggtggat    720

caagtgagag agagccggaa tccaggaaat gctgagttcg aagatctcat ctttttagca    780

cggtctgcac tcatattgag agggtcagtt gctcacaagt cctgcctgcc tgcctgtgtg    840

tatggatctg ccgtagccag tggatacgac tttgaaagag agggatactc tctagtcgga    900

atagaccctt tcagactgct tcaaaacagc caagtataca gcctaatcag accaaatgag    960

aatccagcac acaagagtca actggtgtgg atggcatgcc attctgctgc atttgaagat   1020

ctaagagtat caagcttcat cagagggacg aaagtggtcc caagagggaa gctttccact   1080
```

```
agaggagttc aaattgcttc caatgaaaac atggagacta tggaatcaag taccccttgaa   1140

ctgagaagca gatactgggc cataaggacc agaagtggag ggaacaccaa tcaacagagg   1200

gcttcctcgg gccaaatcag catacaacct acgttctcag tacagagaaa tctccctttt   1260

gacagaccaa ccattatggc agcattcact gggaatacag aggggagaac atctgacatg   1320

agaaccgaaa tcataaggct gatggaaagt gcaagaccag aagatgtgtc tttccagggg   1380

cggggagtct tcgagctctc ggacgaaaag gcaacgagcc cgatcgtgcc ctcctttgac   1440

atgagtaatg aaggatctta tttcttcgga gacaatgcag aggagtacga caattaa      1497
```

```
<210> SEQ ID NO 6
<211> LENGTH: 1362
<212> TYPE: DNA
<213> ORGANISM: Artificial Sequence
<220> FEATURE:
<223> OTHER INFORMATION: A/WSN/1933 genome segments cDNA
      sequence_Segment 6 NA GenBank: LC333187.1

<400> SEQUENCE: 6

atgaatccaa accagaaaat aataaccatt gggtcaatct gtatggtagt cggaataatt     60

agcctaatat tgcaaatagg aaatataatc tcaatatgga ttagccattc aattcaaacc    120

ggaaatcaaa accatactgg aatatgcaac caaggcagca ttacctataa agttgttgct    180

gggcaggact caacttcagt gatattaacc ggcaattcat ctctttgtcc catccgtggg    240

tgggctatac acagcaaaga caatggcata agaattggtt ccaaaggaga cgtttttgtc    300

ataagagagc cttttatttc atgttctcac ttggaatgca ggaccttttt tctgactcaa    360

ggcgccttac tgaatgacaa gcattcaagg gggaccttta aggacagaag cccttatagg    420

gccttaatga gctgccctgt cggtgaagct ccgtccccgt acaattcaag gtttgaatcg    480

gttgcttggt cagcaagtgc atgtcatgat ggaatgggct ggctaacaat cggaatttct    540

ggtccagatg atggagcagt ggctgtatta aaatacaacc gcataataac tgaaaccata    600

aaaagttgga ggaagaatat attgagaaca caagagtctg aatgtacctg tgtaaatggt    660

tcatgtttta ccataatgac cgatggccca agtgatgggc tggcctcgta caaaattttc    720

aagatcgaga aggggaaggt tactaaatcg atagagttga atgcacctaa ttctcactac    780

gaggaatgtt cctgttaccc tgataccggc aaagtgatgt gtgtgtgcag agacaattgg    840

cacggttcga accgaccatg ggtgtccttc gaccaaaacc tagattataa aataggatac    900

atctgcagtg ggttttcgg tgacaacccg cgtcccaaag atggaacagg cagctgtggc    960

ccagtgtctg ctgatggagc aaacggagta aagggatttt catataagta tggcaatggt   1020

gtttggatag gaaggactaa aagtgacagt tccagacatg ggtttgagat gatttgggat   1080

cctaatggat ggacagagac tgatagtagg ttctctatga gacaagatgt tgtggcaata   1140

actaatcggt cagggtacag cggaagtttc gttcaacatc ctgagctaac agggctagac   1200

tgtatgaggc cttgcttctg ggttgaatta atcagggggc tacctgagga ggacgcaatc   1260

tggactagtg ggagcatcat ttctttttgt ggtgtgaata gtgatactgt agattggtct   1320

tggccagacg gtgctgagtt gccgttcacc attgacaagt ag                       1362
```

```
<210> SEQ ID NO 7
<211> LENGTH: 759
<212> TYPE: DNA
<213> ORGANISM: Artificial Sequence
<220> FEATURE:
<223> OTHER INFORMATION: A/WSN/1933 genome segments cDNA
      sequence_Segment 7 M1 GenBank: LC333188.1
```

<400> SEQUENCE: 7

```
atgagtcttc taaccgaggt cgaaacgtac gttctctcta tcgtcccgtc aggccccctc      60
aaagccgaga tcgcacagag acttgaagat gtctttgcag ggaagaacac cgatcttgag     120
gttctcatgg aatggctaaa gacaagacca atcctgtcac ctctgactaa ggggatttta     180
ggatttgtgt tcacgctcac cgtgcccagt gagcggggac tgcagcgtag acgctttgtc     240
caaaatgctc ttaatgggaa cggagatcca aataacatgg acaaagcagt taaactgtat     300
aggaagctta agagggagat aacattccat ggggccaaag aaatagcact cagttattct     360
gctggtgcac ttgccagttg tatgggcctc atatacaaca ggatgggggc tgtgaccact     420
gaagtggcat ttggcctggt atgcgcaacc tgtgaacaga ttgctgactc ccagcatcgg     480
tctcataggc aaatggtgac aacaaccaat ccactaatca gacatgagaa cagaatggtt     540
ctagccagca ctacagctaa ggctatggag caaatggctg gatcgagtga gcaagcagca     600
gaggccatgg atattgctag tcaggccagg caaatggtgc aggcgatgag aaccgttggg     660
actcatccta gctccagtgc tggtctaaaa gatgatcttc ttgaaaattt gcaggcctat     720
cagaaacgaa tgggggtgca gatgcaacga ttcaagtga                            759
```

<210> SEQ ID NO 8
<211> LENGTH: 693
<212> TYPE: DNA
<213> ORGANISM: Artificial Sequence
<220> FEATURE:
<223> OTHER INFORMATION: A/WSN/1933 genome segments cDNA sequence_Segment 8 NS GenBank: LC333189.1

<400> SEQUENCE: 8

```
atggatccaa acactgtgtc aagctttcag gtagattgct ttctttggca tgtccgcaaa      60
agagttgcag accaagaact aggtgatgcc ccattccttg atcggcttcg ccgagatcag     120
aagtccctaa gaggaagagg cagcactctt ggtctggaca tcgaaacagc cacccgtgct     180
ggaaagcaaa tagtggagcg gattctgaag gaagaatctg atgaggcact caaaatgacc     240
atggcctctg tacctgcatc gcgctaccta actgacatga ctcttgagga aatgtcaagg     300
cactggttca tgctcatgcc caagcagaaa gtggcaggcc ctctttgtat cagaatggac     360
caggcgatca tggataagaa catcatactg aaagcgaact tcagtgtgat ttttgaccgg     420
ctggagactc taatattact aagggccttc accgaagagg ggacaattgt tggcgaaatt     480
tcaccactgc cctctcttcc aggacatact gatgaggatg tcaaaaatgc agttggggtc     540
ctcatcggag gacttgaatg gaataataac acagttcgag tctctgaaac tctacagaga     600
ttcgcttgga gaagcagtaa tgagaatggg agacctccac tcactccaaa acagaaacgg     660
aaaatggcgg gaacaattag gtcagaagtt tga                                  693
```

<210> SEQ ID NO 9
<211> LENGTH: 26
<212> TYPE: DNA
<213> ORGANISM: Artificial Sequence
<220> FEATURE:
<223> OTHER INFORMATION: Chop primer_F

<400> SEQUENCE: 9

```
gactcttcat acaccaccac acctga                                           26
```

<210> SEQ ID NO 10
<211> LENGTH: 24

-continued

```
<212> TYPE: DNA
<213> ORGANISM: Artificial Sequence
<220> FEATURE:
<223> OTHER INFORMATION: Chop primer_R

<400> SEQUENCE: 10

gccgctcgtt ctcttcagct agct                                              24


<210> SEQ ID NO 11
<211> LENGTH: 19
<212> TYPE: RNA
<213> ORGANISM: Artificial Sequence
<220> FEATURE:
<223> OTHER INFORMATION: sense oligonucleotides targeting XBP1

<400> SEQUENCE: 11

cacccugaau ucauugucu                                                    19


<210> SEQ ID NO 12
<211> LENGTH: 21
<212> TYPE: RNA
<213> ORGANISM: Artificial Sequence
<220> FEATURE:
<223> OTHER INFORMATION: Negative Xbp1 siRNA
<220> FEATURE:
<221> NAME/KEY: modified base
<222> LOCATION: (20)..(20)
<223> OTHER INFORMATION: n = thymidine
<220> FEATURE:
<221> NAME/KEY: misc_feature
<222> LOCATION: (20)..(21)
<223> OTHER INFORMATION: n is a, c, g, or u
<220> FEATURE:
<221> NAME/KEY: modified base
<222> LOCATION: (21)..(21)
<223> OTHER INFORMATION: n = thymidine

<400> SEQUENCE: 12

uucuccgaac gugucacgun n                                                 21
```

COMPOSITION FOR PREVENTING, TREATING, OR AMELIORATING VIRAL INFECTION DISEASE, CONTAINING A COMPLEX OF ENDOPLASMIC RETICULUM (ER) STRESS INHIBITOR AND REACTIVE OXYGEN SPECIES SCAVENGER AS ACTIVE INGREDIENTS

CROSS REFERENCE TO RELATED APPLICATIONS

This application is a National Stage of International Application No. PCT/KR2020/008466, filed Jun. 29, 2020, claiming priority to Korean Patent Application No. 10-2019-0088151, filed Jul. 22, 2019 and Korean Patent Application No. 10-2019-0110873, filed Sep. 6, 2019, the entire disclosures of which are incorporated herein by reference.

TECHNICAL FIELD

The present disclosure relates to a pharmaceutical composition for preventing or treating a viral infection disease, etc., which contains a complex of a reactive oxygen species production inhibitor and a reactive oxygen species scavenger as an active ingredient.

BACKGROUND ART

In general, reactive oxygen species (ROS) are produced through various mechanisms depending on cell and tissue types due to infection, inflammation, etc. in addition to the basic pathway whereby they are produced as byproducts of normal cellular metabolism via reduction of oxygen molecules. NADPH oxidases (NOXs) on the cell membrane, mitochondria and peroxisomes are implicated in the ROS production. It was also recently found out that ROS may be produced during disulfide bond formation of proteins owing to the action of endoplasmic reticulum oxidoreductin 1 (ERO1) and protein disulfide isomerase (PDI) in endoplasmic reticulum (ER), which is involved in protein folding and secretion and intracellular calcium regulation. Although adequate levels of ROS are cytophysiologically useful for cell differentiation, cell signaling, homeostasis, etc., production of ROS at high levels due to UV irradiation, infection, etc. can be fatal to lipids, proteins and DNAs. Thus, organisms regulate the ROS level through a self-catabolic process. But, excessive ROS production causes oxidative stress.

Organisms have enzymatic or non-enzymatic antioxidant systems to cope with excessive ROS production. The enzymatic antioxidant systems include superoxide dismutases (SODs) and catalases. The ROS not scavenged by SOD or catalase are converted to hydroxyl radicals (—OH), which have short half-life and are very highly reactive. The hydroxyl radical (—OH) is also produced as a byproduct of immune response by macrophages, etc. Unlike superoxides and hydrogen peroxide that can be scavenged by SOD and catalase, —OH that cannot be scavenged by enzymatic reactions is very harmful to organisms. Three forms of SODs are present in organisms. SOD1 is located primarily in the cytoplasm, SOD2 in the mitochondria and SOD3 is extracellular. SOD1 and SOD3 contain copper and zinc ions, while SOD2 has a manganese ion.

Oxidative stress occurs in the body for many reasons. As one of the reasons, increased production of ROS due to viral infection is drawing attentions recently. Influenza A virus (IAV), which is known to cause influenza, is one of the major causes of acute respiratory diseases. IAV causes variable epidemics annually around the world. It is highly communicable as much as to infect 10-20% of the population within 2-3 weeks. The increased production of ROS occurring in IAV infection causes cell death and severe cellular stress. The ROS-mutation theory has been presented to explain the oxidative DNA damage induced by oxidative stress. It has been elucidated that excessive production of ROS in cells causes inflammatory response, cell death, etc. in the short term, and continued exposure to ROS has severe effect on various senescence-related degenerative diseases by aggravating endoplasmic reticulum stress.

The inventors of the present disclosure have first identified that IAV-induced ROS increase viral replication rate and infection rate in in-vitro and animal experiments. Although the accurate mechanism and cause of ROS production by IAV are still unclear, it was confirmed from the research of the inventors of the present disclosure that increase of ROS due to severe endoplasmic reticulum stress has significant effect on host cell damage after viral infection.

DISCLOSURE

Technical Problem

The present disclosure is directed to providing a composition containing an ROS production inhibitor and an ROS scavenger as active ingredients as a pharmaceutical composition, a food composition, a feed additive or a disinfection composition for more effectively preventing, treating or ameliorating a viral infection disease by inhibiting ROS production and scavenging ROS at the same time.

However, the problem to be solved by the present disclosure is not limited to that mentioned above, and other unmentioned problems will be clearly understood by those having ordinary skill in the art from the following description.

Technical Solution

The present disclosure provides a pharmaceutical composition for preventing or treating a viral infection disease, which contains an ROS production inhibitor and an ROS scavenger as active ingredients.

The present disclosure also provides a food composition for preventing or ameliorating a viral infection disease, which contains an ROS production inhibitor and an ROS scavenger as active ingredients.

The present disclosure also provides a feed additive for preventing or ameliorating a viral infection disease, which contains an ROS production inhibitor and an ROS scavenger as active ingredients.

The present disclosure also provides a disinfection composition for preventing a viral infection disease, which contains an ROS production inhibitor and an ROS scavenger as active ingredients.

The present disclosure also provides a fragrance composition containing an ROS production inhibitor and an ROS scavenger as active ingredients.

In an exemplary embodiment of the present disclosure, the ROS production inhibitor may decrease ROS production by preventing or inhibiting endoplasmic reticulum stress. Specifically, the ROS production inhibitor may be one or more selected from a group consisting of 4-phenylbutyrate (4-PBA), taurine-conjugated ursodeoxycholic acid (TUDCA), 3-methyladenine (3-MA) and chloroquine (chloroquine diphosphate), more specifically 4-PBA.

In another exemplary embodiment of the present disclosure, the ROS scavenger may be superoxide dismutase 1 (SOD1) and may further include one or more selected from a group consisting of N-acetylcysteine (NAC), glutathione, catalase, butylated hydroxyanisole (BHA), butylated hydroxytoluene (BHT), ascorbic acid and tocopherol. It may be specifically a complex of SOD1 and NAC and/or BHA, more specifically SOD1 and NAC.

In another exemplary embodiment of the present disclosure, the composition may be for nasal, oral or inhalation administration. Specifically, it may be for inhalation administration into the bronchi through respiration.

In another exemplary embodiment of the present disclosure, the virus may be a virus having an RNA genome. Nonlimiting examples of the virus include influenza A virus, human immunodeficiency virus, coronavirus, etc. When considering the formulation and administration method of the pharmaceutical composition of the present disclosure, the virus may be a respiratory disease-inducing virus including influenza A virus and coronavirus.

In addition, the present disclosure provides a method for preventing or treating a viral infection disease, which includes a step of administering a complex agent of an ROS production inhibitor and an ROS scavenger to a subject.

In an exemplary embodiment of the present disclosure, the ROS production inhibitor and the ROS scavenger may be administered simultaneously or sequentially. Specifically, they may be administered simultaneously as being mixed in one composition.

In another exemplary embodiment of the present disclosure, the complex agent of an ROS production inhibitor and an ROS scavenger may be administered through the mouth or nose of a subject. For nasal administration, the complex agent may be sprayed into the nose. That is to say, the administration method is not limited as long as the complex agent can be delivered to the bronchi of the subject. Specifically, it may be administered to a subject through respiration. In another exemplary embodiment of the present disclosure, the administration may be made one or more times a day.

In addition, the present disclosure provides a use of a complex agent of an ROS production inhibitor and an ROS scavenger for preparation of a medicine for preventing or treating a viral infection disease.

Advantageous Effects

The present disclosure relates to a composition capable of preventing, treating and ameliorating a viral infection disease. The composition of the present disclosure can be safely applied to the human body because the safety of a reactive oxygen species production inhibitor and a reactive oxygen species scavenger has been verified already. The present disclosure utilizes the mechanism of viruses which induces oxidative damage of a host cell and activates viral replication and infection. The present disclosure is advantageous in that the proliferation of all viruses that induce oxidative stress can be inhibited effectively regardless of the type or mutation of the viruses, although there is no direct specificity for specific viruses unlike the existing vaccines. In addition, since the composition of the present disclosure can inhibit viral proliferation regardless of mutation, it can be used as a global infection inhibitor and therapeutic agent as a limited alternative to vaccines that must be newly developed every year due to the emergence of viral mutations. Besides, the composition of the present disclosure is advantageous in that viral proliferation can be inhibited and, at the same time, cellular and tissue damage caused by oxidative stress can be minimized.

BEST MODE

Figure 1:
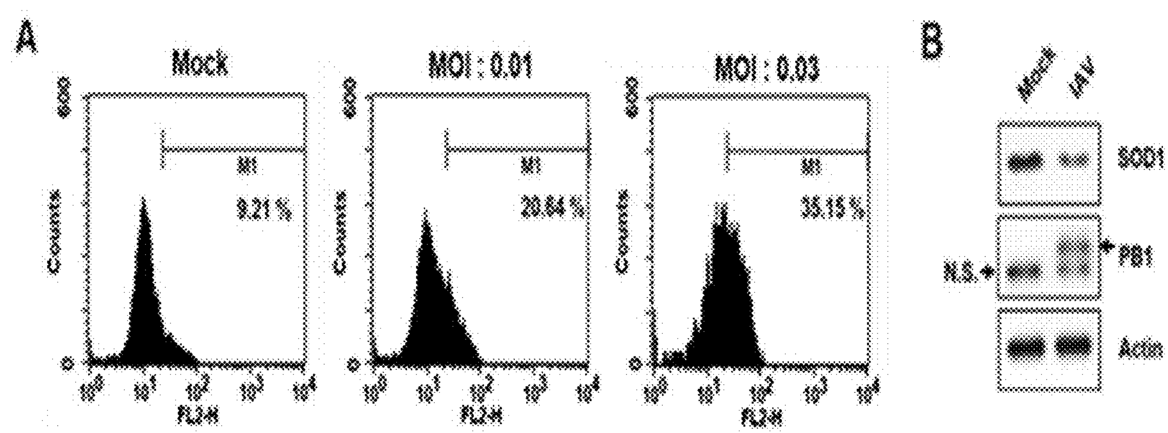
FIG. 1 shows that influenza A virus (IAV) infection in vitro results in increased ROS production, reduction in SOD1 and increased expression of the viral protein PB1.

The present disclosure relates to a complex antioxidant and antiviral composition which minimizes tissue damage through effective inhibition of ROS production and scavenging of ROS in a respiratory infection and related diseases, which cause ROS overproduction and inflammation, and is used for prevention and treatment of a viral infection disease.

The inventors of the present disclosure have researched about the relationship between oxidative stress occurring in host cells infected by influenza virus and the infection and proliferation of the virus. As a result, they have identified that viral infection results in decreased expression of SOD1 and increased ROS production, suggesting that the infection owing to viral proliferation and the accumulation of ROS are sufficient conditions. In addition, it was confirmed that the decrease of SOD1 and the increase of ROS are caused by the activation of the endoplasmic reticulum stress response mechanism and, when the viral infection mechanism is utilized conversely to scavenge the produced ROS, a viral titer is decreased. This shows that that the infection owing to viral proliferation and the accumulation of ROS are not merely sufficient conditions but necessary and sufficient conditions. Therefore, it was confirmed that the co-administration of SOD1 and an ROS scavenger and the co-administration of an ROS production inhibitor and an ROS scavenger effectively inhibit cell death and prevent a viral infection disease. In addition, it was confirmed through experiments that, the inhibition of the endoplasmic reticulum stress response mechanism combined with the scavenging of the produced ROS is significantly more effective in blocking viral infection and/or proliferation as compared to treatment with an ROS scavenger alone.

More specifically, it was confirmed through an in-vitro experiment using human A549 alveolar epithelial cells that the production of ROS is increased in proportion to the MOI of the infecting virus. And, as a result of investigating the change in the expression level of SOD1, which acts as an ROS scavenger in cells, in order to find out the cause of increased ROS by viral infection more specifically, the expression of SOD1 was decreased as the replication of the virus genome proceeded. At the same time, decreased SOD1 or increased ROS due to viral infection resulted in increased viral proliferation (see Example 1).

In a specific exemplary embodiment of the present disclosure, it was confirmed that ROS accumulation affects the replication ability of not only influenza virus (IAV) but also retrovirus HIV and coronavirus. That is to say, it was confirmed again that viral replication and infection and ROS accumulation are sufficient conditions (see Examples 2 and 6).

In addition, it was investigated by which mechanism the ROS production is increased by viral infection. For this, the expression level of autophagy- and endoplasmic reticulum stress-activating marker genes in A549 cells infected by virus was investigated. As a result, it was confirmed that the autophagy and endoplasmic reticulum stress mechanisms are activated by viral infection and that the inactivation of the LC3 and XBP1 genes, which are intermediary factors of the signaling pathways of the activation mechanisms, decreases ROS production due to viral infection by about 30%, suggesting that the ROS production increased due to viral infection is owing to the autophagy or endoplasmic reticulum stress response mechanism (see Examples 3 and 4).

Therefore, in order to investigate whether treatment with inhibitors specific for autophagy and endoplasmic reticulum stress responses provides antiviral effect based on the relationship between the responses and the amount of the SOD1 protein, A549 cells were treated with 3-MA or chloroquine and 4-PBA in vitro and then the change in the level of the SOD1 protein was measured. As a result, when the mechanism of autophagy or endoplasmic reticulum stress response was blocked during viral infection, the decrease of the SOD1 protein was reduced significantly, suggesting that the activation of autophagy and endoplasmic reticulum stress responses can significantly affect the decrease in SOD1 expression (see Examples 3 and 5). But, this effect can vary depending on the duration of infection and the administration dosage of the virus. In addition, when considering the cause of autophagy and endoplasmic reticulum stress responses, etc., it can be seen that the treatment with an inhibitor of endoplasmic reticulum stress can provide a more stable effect of inhibiting viral infection.

The inventors of the present disclosure have further investigated the effect of the activation of the mechanism of endoplasmic reticulum stress response on viral proliferation. Specifically, after infecting cells deficient in the intermediary factor IRE1 gene of the endoplasmic reticulum stress signaling pathway with a virus, the change in the expression level of viral proteins was measured to investigate the change in viral replication rate. As a result, when the endoplasmic reticulum stress response mechanism was blocked, the expression level of viral proteins was decreased remarkably. From this, it can be seen that the activation of endoplasmic reticulum stress is an essential condition for viral infection and proliferation, rather than a phenomenon of viral infection (see Example 4).

After confirming that the activation of the endoplasmic reticulum stress response mechanism is a necessary condition for viral infection and proliferation, the inventors of the present disclosure have sought fora practically applicable composition for inhibiting viral infection and/or proliferation. Through in-vivo experiments, they have identified that the amount of ROS remaining in a bronchoalveolar lavage fluid is increased and the amount of SOD1 expressed in lung tissue is decreased due to viral infection and, when SOD1 is administered externally to the infected animal model, the amount of accumulated ROS in the bronchoalveolar lavage fluid is decreased and the amount of SOD1 in the lung tissue is restored to a level similar to that before the infection (see Example 5).

In addition, they have investigated the effect of the decrease in ROS production and the recovery of SOD1 due to the administration of an ROS scavenger to the animal model on viral proliferation by analyzing the survivability (body weight) of the acutely infected animal model. As a result, the body weight decrease caused by viral infection was significantly restored even with the single administration of ROS-scavenging SOD1, suggesting that excessive ROS accumulation owing to the activation of the endoplasmic reticulum stress response mechanism is a necessary condition for active viral proliferation. The administration of the ROS production inhibitor 4-PBA also restored the body weight decrease caused by viral infection. A similar antiviral effect was achieved by inhibiting ROS production and/or scavenging ROS. When their synergistic effect was investigated, the co-treatment of an ROS production inhibitor (4-PBA) and an ROS scavenger (NAC) showed a high synergistic effect as compared to single treatment. It was also confirmed that the co-treatment decreased the replication rate of coronavirus. Accordingly, it also confirmed that the composition of the present disclosure can ameliorate or treat a viral infection disease (see Example 6).

Meanwhile, the inventors of the present disclosure have investigated an optimal combination of an ROS production inhibitor and an ROS scavenger capable of inhibiting viral proliferation by blocking ROS production and accumulation pathways in an animal model. Specifically, co-treatment with SOD1 (50 units/mouse) and another ROS production inhibitor and/or ROS scavenger in an IAV infection animal model exhibited remarkably superior synergistic effect of reducing ROS production and decreasing viral titer as compared to treatment with SOD1 alone (see Example 7).

In addition, in order to investigate the effect of the complex agent for preventing a viral infection disease, a tissue culture was treated with the complex agent prior to IAV infection or an animal was infected 2 days after the treatment. For the animal infection, a solution of the complex agent was sprayed in a cage to create a situation similar to that of airborne infection. As a result, the pretreatment with the complex composition reduced the death of host cells in the tissue culture and reduced the body weight of the experimental animal in the early stage of infection as compared to an untreated group, confirming that early administration is effective for preventing infection (see Example 8).

Finally, the therapeutic effect of the composition of the present disclosure as an antiviral agent was tested in an animal experiment. As a result, whereas the treatment with SOD1 alone slightly inhibited body weight decrease, the co-administration with an ROS production inhibitor and an ROS scavenger significantly inhibited body weight decrease. In particular, when a complex agent of SOD1, 4-PBA and NAC at 12 DPI was nasally administered to a mouse, the body weight of the mouse was restored up to 96% of that before the infection, confirming that the complex agent of the present disclosure exhibits therapeutic effect for a viral infection disease. Meanwhile, nasal administration of (NS) the complex agent exhibited better effect than oral administration (OA) (see Example 9). Accordingly, the present disclosure may provide a composition for preventing, treating or ameliorating a viral infection disease, which contains an ROS production inhibitor and an ROS scavenger as active ingredients.

In the present disclosure, "glutathione (GSH)" is a representative antioxidant which is the most abundant in the body and assists various enzymes. It is known that intracellular oxidative stress leads to decrease or deficiency of GSH.

In the present disclosure, "N-acetylcysteine (NAC)" acts directly as an antioxidant or exhibits an indirect antioxidant effect by acting as a precursor to GSH. It is known to cause various side effects in the body. Therefore, when NAC is contained in the composition of the present disclosure, the content of NAC may be specifically adjusted to 1 mg or less per unit body weight (20 g) of an animal subject. In the present disclosure, when NAC is co-treated with SOD1, the effect of recovery of body weight, decreased ROS accumulation in the bronchi and decreased viral titer may be achieved even with a smaller dosage.

In the present disclosure, "butylated hydroxyanisole (BHA)" is frequently used as a food preservative because it is oil-soluble and stabilizes and scavenges ROS.

In the present disclosure, "superoxide dismutase 1 (SOD1)" and "catalase" are ROS scavengers produced in the body. Because SOD1 is present in cells of a subject as intracellular molecules unlike SOD3 which is exocytosed extracellularly, it is doubtful if the active ingredient can be delivered effectively and maintains its activity when applied to an animal model. Through the examples of the present disclosure, it was confirmed that SOD1 effectively scavenges ROS in cells in an animal model regardless of whether it is administered orally or nasally.

In the present disclosure, "4-phenylbutyrate (4-PBA)" inhibits ROS production by inhibiting endoplasmic reticulum stress and stabilizes SOD1 at the same time.

In the present disclosure, the "endoplasmic reticulum (ER) stress" refers to a state where the functional disorder of the endoplasmic reticulum occurs as excessive immature proteins are introduced into the endoplasmic reticulum or calcium in the endoplasmic reticulum is depleted due to physiological or pathological environments. Endoplasmic reticulum (ER) stress response occurs as a defense mechanism against the endoplasmic reticulum stress. The endoplasmic reticulum stress response includes decreased translation of mRNA into protein due to phosphorylation of eIF2α (eukaryotic translation initiation factor 2 alpha subunit), increased expression of chaperone due to phosphorylation of IRE1/XBP-1 and ATF6 (activating transcription factor 6) and thus improved protein folding ability of the endoplasmic reticulum, increased apoptosis due to activation of the CHOP (C/EBP homologous protein), caspase-12, and/or JNK (c-JUN NH2-terminal kinase) gene, etc.

Accordingly, in the present disclosure, an "endoplasmic reticulum stress inhibitor" is not limited as long as it delays or blocks the onset of a defense mechanism against endoplasmic reticulum stress or reduces the degree of endoplasmic reticulum stress response, and a "reactive oxygen species production inhibitor" is not limited as long as it inhibits the production of reactive oxygen species as byproducts of various mechanisms in cells. Specifically, it may by reduce the production and/or accumulation of reactive oxygen species as one of several byproducts of endoplasmic reticulum stress response by blocking the defense mechanism against viral infection-induced endoplasmic reticulum stress or reducing the degree of activation of the mechanism.

Since the composition of the present disclosure can not only significantly increase the efficiency of inhibiting viral proliferation and infection by scavenging ROS and fundamentally inhibiting ROS production through treatment with a complex agent including an ROS production inhibitor and an ROS scavenger including SOD1 but also inhibit cell death by blocking the activation of endoplasmic reticulum stress, it can prevent or minimize the damage of cells, tissues, etc. in a subject.

In the present disclosure, "prevention" refers to any action of delaying the onset of a disease by delaying viral infection or inhibiting viral replication by administering the composition according to the present disclosure, "treatment" refers to any action of improving or favorably changing the symptoms of a viral infection disease by administering the pharmaceutical composition according to the present disclosure, and "amelioration" refers to any action of decreasing parameters associated with a viral infection disease, e.g., the degree of symptoms, by administering the composition according to the present disclosure.

In the present disclosure, the viral infection disease to be prevented, treated or ameliorated is not limited as long as the cells infected by a virus cannot function normally due to the replication of the genetic materials of the virus regardless of the occurrence of symptoms. The virus causing the disease may have either a DNA genome or an RNA genome as long as it increases ROS production by inducing endoplasmic reticulum stress in the infected cell.

In the present disclosure, the "subject" refers to a vertebrate such as a mammal including human and livestock, a bird, etc. Specifically, it may refer to human or livestock.

In the present disclosure, the reactive oxygen species production inhibitor and the reactive oxygen species scavenger may be used in the form of pharmaceutically acceptable salts. Specifically, the salts may be acid addition salts formed by pharmaceutically acceptable free acids.

In the present disclosure, the "salt" may be specifically an acid addition salt formed by a pharmaceutically acceptable free acid. The acid addition salt is obtained from an inorganic acid such as hydrochloric acid, nitric acid, phosphoric acid, sulfuric acid, hydrobromic acid, hydroiodic acid, nitrous acid or phosphorous acid, or a nontoxic organic acid such as aliphatic mono or dicarboxylate, phenyl-substituted alkanoate, hydroxyalkanoate, alkanedioate, aromatic acid or aliphatic or aromatic sulfonate. The pharmaceutically nontoxic salt includes sulfate, pyrosulfate, bisulfate, sulfite, bisulfite, nitrate, phosphate, monohydrogen phosphate, dihydrogen phosphate, metaphosphate, pyrophosphate, chloride, bromide, iodide, fluoride, acetate, propionate, decanoate, caprylate, acrylate, formate, isobutyrate, caprate, heptanoate, propiolate, oxalate, malonate, succinate, suberate, sebacate, fumarate, maleate, butane-1,4-dioate, hexane-1,6-dioate, benzoate, chlorobenzoate, methyl benzoate, dinitrobenzoate, hydroxy benzoate, methoxybenzoate, phthalate, terephthalate, benzenesulfonate, toluenesulfonate, chlorobenzenesulfonate, xylenesulfonate, phenyl acetate, phenyl propionate, phenyl butyrate, citrate, lactate, β-hydroxybutyrate, glycolate, malate, tartrate, methanesulfonate, propanesulfonate, naphthalene-1-sulfonate, naphthalene-2-sulfonate or mandelate.

The acid addition salt according to the present disclosure may be prepared by a common method, e.g., by dissolving the reactive oxygen species production inhibitor and/or the reactive oxygen species scavenger in an excess aqueous acid solution and then precipitating the salt using a water-miscible organic solvent, e.g., methanol, ethanol, acetone or acetonitrile. It may also be prepared by evaporating the solvent or excess acid from the mixture and then drying or suction filtering the precipitated salt.

In addition, a pharmaceutically acceptable metal salt may be prepared using a base. For example, an alkali metal or alkaline earth metal salt is prepared by dissolving a compound in a solution of excess alkali metal hydroxide or alkaline earth metal hydroxide, filtering the undissolved compound salt and then evaporating and drying the filtrate. Specifically, the metal salt may be a sodium, potassium or calcium salt. In addition, a silver salt may be prepared by reacting an alkali metal or alkaline earth metal salt with a suitable silver salt (e.g., silver nitrate).

In addition, the composition of the present disclosure may contain, in addition to the pharmaceutically acceptable salt, all salts, isomers, hydrates and solvates that may be prepared by common methods.

In the present disclosure, the pharmaceutical composition may further contain a suitable carrier, excipient or diluent commonly used for preparation of a pharmaceutical composition.

In the present disclosure, the "carrier" is also called a vehicle and refers to a compound which facilitates the delivery of a compound into cells or tissues. For example, dimethyl sulfoxide (DMSO) is a carrier which is the most commonly used to facilitate the delivery of many organic compounds into the cells or tissues of organisms.

In the present disclosure, a "diluent" is defined as a compound which stabilizes the biologically active form of a target compound and is diluted in water in which the compound is dissolved. Salts dissolved in buffer solutions are used as diluents in the related art. Phosphate-buffered saline is commonly used as a buffer solution because it mimics the environment of the human body fluid. Because a buffer salt can control the pH of a solution at low concentration, the biological activity of a compound is hardly changed by the buffer diluent. The compound of the present disclosure may be administered to a human patient either as it is or as being mixed in a pharmaceutical composition together with other ingredients or an appropriate carrier or excipient.

In addition, the pharmaceutical composition according to the present disclosure may be formulated into a powder, a granule, a tablet, a capsule, a suspension, an emulsion, a syrup, a formulation for external application such as an aerosol, etc. or a sterilized solution for injection according to a common method. Carriers, excipients or diluents that may be contained in the composition according to the present disclosure include lactose, dextrose, sucrose, oligosaccharide, sorbitol, mannitol, xylitol, erythritol, maltitol, starch, acacia gum, alginate, gelatin, calcium phosphate, calcium silicate, cellulose, methyl cellulose, microcrystalline cellulose, polyvinylpyrrolidone, water, methyl hydroxybenzoate, propyl hydroxybenzoate, talc, magnesium stearate and mineral oil. For formulation, a commonly used diluent or excipient such as a filler, an extender, a binder, a wetting agent, a disintegrant, a surfactant, etc. is used. Solid formulations for oral administration include a tablet, a pill, a powder, a granule, a capsule, etc. The solid formulation is prepared by mixing the compound with at least one excipient, e.g., starch, calcium carbonate, sucrose, lactose, gelatin, etc. In addition to a simple excipient, a lubricant such as magnesium stearate and talc is also used. Liquid formulations for oral administration include a suspension, an internal solution, an emulsion, a syrup, etc. The liquid formulation may contain, in addition to a simple diluent such as water or liquid paraffin, various excipients, e.g., a wetting agent, a sweetener, an aromatic, a preservative, etc. Formulations for parenteral administration include a sterilized aqueous solution, a nonaqueous solution, a suspension, an emulsion, a lyophilized formulation and a suppository. As the nonaqueous solution or suspension, propylene glycol, polyethylene glycol, vegetable oil such as olive oil, injectable ester such as ethyl oleate, etc. may be used. As a base of the suppository, witepsol, macrogol, Tween 61, cocoa butter, laurin butter, glycerogelatin, etc. may be used.

A therapeutically effective amount of the composition of the present disclosure containing a reactive oxygen species production inhibitor and a reactive oxygen species scavenger may be determined at an early stage of cell culture assay. For example, a dose may be calculated in an animal model to obtain a circulation concentration range including $IC_{50}$ (half maximal inhibitory concentration) or $C_{50}$ (half maximal effective concentration) determined during cell culture. This information can be used to more exactly determine a useful dose in human. The administration dosage of the composition of the present disclosure may vary within the above range depending on the employed administration type and administration route.

A specific administration dosage of the pharmaceutical composition of the present disclosure may vary depending on the patient's condition and body weight, the severity of a disease, drug type, administration route and duration, and may be appropriately selected by those skilled in the art. However, for a preferred effect, the pharmaceutical composition of the present disclosure may be administered at a daily dosage of 0.0001-1000 mg/kg, specifically 0.5-200 mg/kg, more specifically 0.5-100 mg/kg. The administration may be performed once or several times a day. The administration dosage does not limit the scope of the present disclosure in any aspect.

The pharmaceutical composition according to the present disclosure may be administered to a mammal such as mouse, rat, livestock, human, etc. by various routes including parenteral and oral routes. All modes of administration may be expected. For example, it may be administered intrarectal, intravenous, intramuscular, subcutaneous, intrauterine or intracerebroventicular injection, orally or nasally. Specifically, it may be inhaled into the nose or mouth of a subject.

Therefore, the complex agent consisting of a reactive oxygen species production inhibitor and a reactive oxygen species scavenger of the present disclosure may be provided as an inhalant and, in this case, the complex agent may be contained in an inhalant in the form of an aqueous solution or a dried powder. In addition, the inhalant may be in the form of an aerosol containing a mixture of one or more pharmaceutically acceptable propellant and a carrier.

The formulation for oral administration may also be administered once or several times a day depending on the age, sex and body weight of a patient. In addition, the administration dosage may be increased or decreased depending on administration route, the severity of a disease, the age, sex and body weight of a patient, etc. Accordingly, the administration dosage of the present disclosure does not limit the scope of the present disclosure by any means.

In the present disclosure, when the composition is provided as a mixture containing another ingredient in addition to a reactive oxygen species production inhibitor and a reactive oxygen species scavenger, the composition may contain the endoplasmic reticulum stress inhibitor and the reactive oxygen species scavenger in an amount of 0.001-99.9 wt %, specifically 0.1-99 wt %, more specifically 30-50 wt %, based on the total weight of the composition.

In addition, the present disclosure provides a food composition for preventing or ameliorating a viral infection disease, which contains a reactive oxygen species production inhibitor and a reactive oxygen species scavenger as active ingredients. In addition, the reactive oxygen species production inhibitor and the reactive oxygen species scavenger may be added to food for preventing the onset or transmission of a viral infection disease. When the reactive oxygen species production inhibitor and the reactive oxygen species scavenger of the present disclosure are used as food additives, the reactive oxygen species production inhibitor and the reactive oxygen species scavenger may be added as they are or may be used together with other foods or food ingredients according to common methods. The mixing amount of the active ingredients may be determined adequately according to the purpose of use (prevention, health care or therapeutic treatment). In general, for preparation of a food or a beverage, the active ingredient of the present disclosure is added in an amount of 15 wt % or less, specifically 10 wt % or less. However, for long-term intake intended to intended to improve health or hygiene, the amount of the active ingredient may be smaller. In addition, since the active ingredient has no safety issue, it may also be used in higher amounts.

In the present disclosure, the food includes a functional food and functional health food. The 'functional food' refers to a food obtained by adding the reactive oxygen species production inhibitor and the reactive oxygen species scavenger of the present disclosure to a general food so as to improve the functionality of the general food. The functionality can be broadly divided into physical property and physiological functionality. When the reactive oxygen species production inhibitor and the reactive oxygen species scavenger of the present disclosure are added to a general food, the physical property and physiological functionality of the general food will be improved. In the present disclosure, such a food having improved functionality is generally defined as a 'functional food'.

Since the functional food of the present disclosure inhibits viral replication by reducing the synthesis of viral proteins, it may be used variously in drugs, foods, beverages, etc. for preventing or ameliorating a viral infection disease. The food is not specially limited in type. Examples of the food include meat, sausage, bread, chocolate, candies, snacks, confectionery, pizza, ramen, other noodles, gums, dairy products including ice creams, soups, beverages, tea, drinks, alcoholic beverages, vitamin complexes, etc.

A health beverage composition according to the present disclosure may contain various flavorants, natural carbohydrates, etc. as additional ingredients like common beverages. The natural carbohydrate may be a monosaccharide such as glucose and fructose, a disaccharide such as maltose and sucrose, a polysaccharide such as dextrin and cyclodextrin, or a sugar alcohol such as xylitol, sorbitol, erythritol, etc. As a sweetener, a natural sweetener such as thaumatin and *stevia* extract or a synthetic sweetener such as saccharin and aspartame may be used. The proportion of the natural carbohydrate may be generally about 0.01-20 g, specifically about 5-12 g, per 100 mL of the composition of the present disclosure.

In addition, the composition of the present disclosure may further contain various nutrients, vitamins, electrolytes, flavorants, colorants, pectic acid and its salts, alginic acid and its salts, organic acids, protective colloidal thickeners, pH control agents, stabilizers, antiseptics, glycerin, alcohols, carbonating agents used in carbonated beverages, etc. Besides, the composition of the present disclosure may contain a pulp for preparing natural fruit juice, fruit juice beverages and vegetable beverages. These ingredients may be used either independently or in combination. The proportion of the additive is of no significant importance but is generally selected in a range of 0.01-0.20 part by weight based on 100 parts by weight of the composition of the present disclosure.

MODE FOR INVENTION

The present disclosure may be changed variously and may have various exemplary embodiments. Hereinafter, specific examples will be described referring to drawings. However, it should be understood that the present disclosure is not limited to specific exemplary embodiments but includes all changes, equivalents and substitutes encompassed in the technical idea and scope of the present disclosure. In the following description of the present disclosure, the description of known technology will be omitted if it unnecessarily obscures the gist of the present disclosure.

Materials and Methods

1. Production and Culturing of Influenza Virus

Recombinant IAV (A/WSN/1933) was provided by R. G. Webster (University of Tennessee, TN, USA). A set of plasmids containing cDNAs for eight viral RNAs (SEQ ID NOS 1-8) were co-transfected into 293T cells. After culturing the cells, a supernatant was obtained through centrifugation.

Specifically, transfection was performed for 24 hours using Lipofectamine 2000 as a transfection agent. 293T cells were transfected by culturing in DMEM containing 10% FBS. Next day, the medium was replaced with Opti-MEM containing 0.3% BSA. After culturing for 48 hours, the cell culture was centrifuged at 13,000 rpm for 1-2 minutes and the virus was acquired from the supernatant.

Then, after infecting Madin-Darby canine kidney (MDCK) cells with the acquired IAV, the virus to be used was acquired 24-48 hours later.

2. Viral Titer Analysis (Plaque Assay)

MDCK cells were used for plaque assay. After seeding $1.0\times10^6$ MDCK cells per well onto a 6-well plate, 500 μL of serially diluted virus was added to each well at 100% confluency and infection was performed for 1 hour. Opti-MEM supplemented with 0.3% BSA and 1 μg/mL TPCK-trypsin was used as a medium, and the medium was replaced with an agar medium (2× L-15 medium, 0.8% agar, 0.075% $NaHCO_3$, 1 μg/mL TPCK-trypsin, 0.3% BSA, 1× glutamate/antibiotics) after the infection. Then, the medium was maintained at room temperature for hardening and then incubated at 37° C. and 5 atm under a $CO_2$ condition for 2-3 days.

3. Viral Infection and Animal Experiment

Human A549 alveolar epithelial cells were infected with 0.01 MOI of the virus. 1 hour later, the cells were washed with PBS (phosphate-buffered saline) and cultured for 24 hours in RPMI 1640 or DMEM containing 2% FBS.

Animal infection experiment was conducted using 3-week-old mice (BALB/c or C57BL/6N). After infecting the mice intranasally, body weight was measured with time. After anesthetizing the mice and acquiring lung tissue, viral titer was determined by plaque assay and ROS in BALF (bronchoalveolar lavage fluid) were analyzed.

4. Western Blot

After inoculating cells on a 12-well plate at $1.5\times10^5$ cells/well, the cells were incubated for 24 hours. The cells of a negative control group (medium only) or a control group (infection at MOI 0.01 or 0.03 only), or the cells treated with XBP1 (X-box binding protein 1) siRNA were lysed with Nonidet-P40 (150 mM NaCl, 1% NP-40, 50 mM Tris pH 8.0, 2 mg/mL aprotinin, 1 mM leupeptin, 0.1 mM PMSF) on ice for 15 minutes and centrifuged at 13,000 rpm for 15 minutes. The supernatant was separated on 12.5% PAGE. After transferring onto a PVDF membrane, analysis was conducted using SOD1, NP and actin antibodies.

5. RT-PCR

After seeding and culturing cells on a 12-well plate at $1.5\times10^5$ cells/well, the cells were infected with IAV and cultured for 24 hours. After isolating RNA from the cells of a negative control group (medium only) or a control group (infection at MOI 0.01 only), cDNA was acquired through reverse transcription. For measurement of the expression level of Chop (C/EBP homologous protein), Chop mRNA expression was investigated by polymerase chain reaction using the acquired cDNA as a template and using Chop primers (sense, 5'-GACTCTTCATACACCACCACACCTGA-3'; antisense, 5'-GCCGCTCGTTCTCTTCAGCTAGCT-3').

6. Genome Copy Quantification Assay

After seeding and culturing Vero E6 cells on a 24-well plate, the cells were infected with 0.05 MOI of SARS-CoV-2 for 1 hour and then cultured for 48 hours after treating with an antiviral agent or not (control group). Viral RNA was isolated using a viral RNA isolation kit and then kept at −80° C. Genome copy quantification assay was performed for the E gene encoding SARS-CoV-2 envelope protein, and qRT-PCR was conducted using a Power SYBR Green RNA-to-$C_T$ 1-Step kit (Applied Biosystems).

7. Measurement of Intracellular ROS

After seeding cells on a 12-well plate at $1\times10^5$ cells/well, the cells were cultured for 24 hours after treating with HIV-Tat protein or $H_2O_2$ or infecting with IAV. After preparing the cells of a negative control group (medium only) or a control group (infection at MOI 0.01 or 0.03 only) or the cells treated with XBP1 siRNA into a single cell suspension in PBS (phosphate-buffered saline), they were stained with a fluorescent dye at a ratio of 1/5,000 at room temperature for 30 minutes.

For analysis of ROS in BALF (bronchoalveolar lavage fluid), lung tissue was rinsed with PBS and cells were isolated from the lung tissue. After preparing a single cell suspension, the cells were stained with a fluorescent dye at a ratio of 1/5,000 at room temperature for 30 minutes. Flow cytometry was performed using FACS-Calibur (BD Biosciences).

Intracellular ROS ($H_2O_2$) production was measured by flow cytometry (FACS-Calibur, Becton-Dikinson) using 2',7'-dichlorofluorecein diacetate (DCFH-DA, Sigma) after washing with PBS. Superoxide anion production was measured using a superoxide detection system (Enzo Life Sci.).

8. Reporter Gene Assay

For preparation of the luciferase reporter pLTR-Luc, the U3 and R regions of HIV1 promoter 5'-long terminal repeats (−453 to +82) were inserted into pGL3-basic (Promega, Madison, WI). After transfection of pLTR-Luc, experiment was conducted using a Promega luciferase assay kit according to the manufacturer's instructions.

9. Preparation of SOD1 Expression Vector

The SOD1 expression vector pET-SOD1 was constructed for large-scale production of the human SOD1 gene through bacterial culture. The pET-26b(+) plasmid was used as a backbone (transfer vector). After digesting the vector with NdeI and HindIII, the human SOD1 gene was amplified by PCR using the primer pairs 5'-CCCAAGCTTT TATTGGGCGA TC-3' and 5'-TTCCATATGA TGGCGACGAA GGCC-3'. Then, the product was cloned through thermal denaturation and renaturation. After introducing the pET-SOD1 into bacteria, the expression result was investigated using 1 mM IPTG.

10. Statistical Analysis

The difference between the control group and the test group was evaluated by paired Student's t-test. P-values<0.05 were considered significant.

EXPERIMENTAL RESULTS

Example 1. Increase of ROS and Decrease of SOD1 Due to Influenza Viral Infection In order to measure ROS produced due to influenza viral infection, A549 cells were infected at an MOI (multiplicity of infection) of 0.01 or 0.03 for 24 hours. As a result of treating the infected cells with a substance binding specifically to superoxide anion, it was confirmed through flow cytometry that ROS were increased as the viral MOI was increased (see FIG. 1, A).

In order to investigate the cause of increased ROS production induced by viral infection, western blot was performed on the A549 cells infected with an MOI of 0.01 and the change in the expression level of SOD1 which acts as an ROS (superoxide anion) scavenger was compared. As a result, it was confirmed that the quantity of the SOD1 protein was decreased significantly in the infected cells as the expression of the gene polymerase PB1 was increased (see FIG. 1, B). From this result, it was confirmed that influenza viral infection induces decreased expression of the SOD1 protein and thereby increases ROS.

Figure 2:
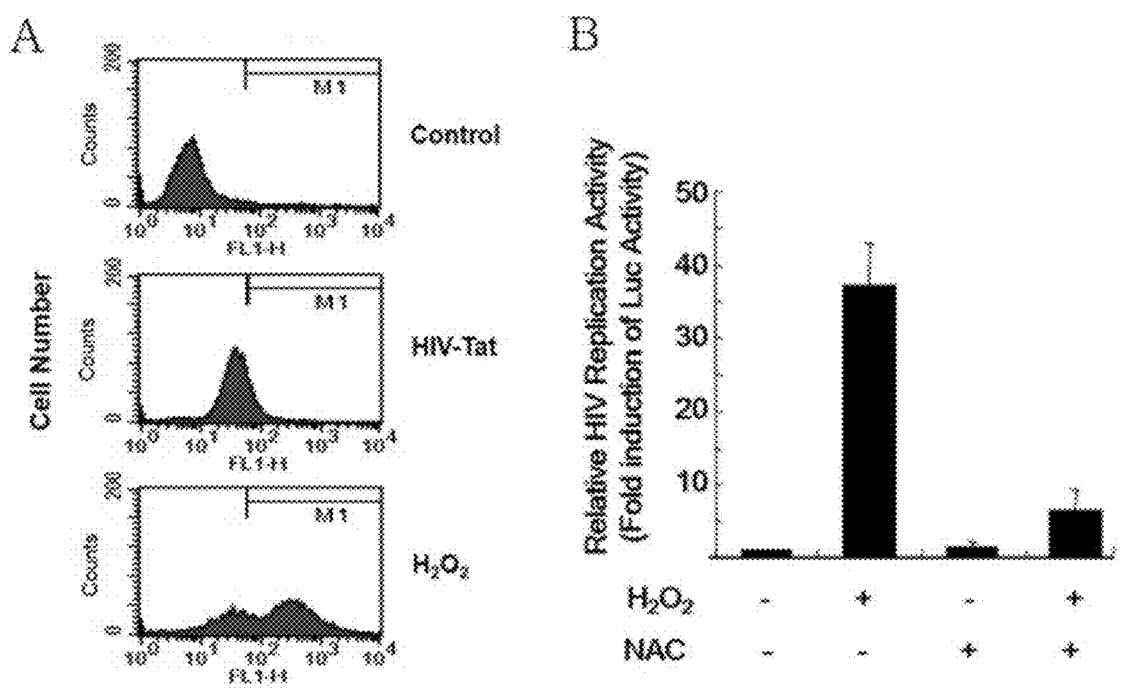
FIG. 2 shows that treatment with HIV Tat protein or external $H_2O_2$, which plays a major role during infection by acquired immunodeficiency syndrome (AIDS)-causing human immunodeficiency virus (HIV), increases ROS production. The figure shows that treatment with the ROS scavenger NAC leads to decrease in the HIV replication activity which was increased due to ROS.

Example 2. Effect of HIV Gene Expression on ROS Production and Viral Replication Rate It was confirmed that the treatment with HIV Tat protein, which plays a major role in acquired immunodeficiency syndrome (AIDS)-causing HIV (human immunodeficiency virus) infection, leads to ROS production at a level comparable to the $H_2O_2$ is treated from outside (see FIG. 2, A). From the result showing that the increase of HIV replication rate (activity of HIV long terminal repeat-luciferase reporter) due to ROS is inhibited by treatment with the representative ROS scavenger NAC, it was confirmed that the ROS produced due to HIV infection plays a major role in viral replication and infection (see FIG. 2, B).

Figure 3:
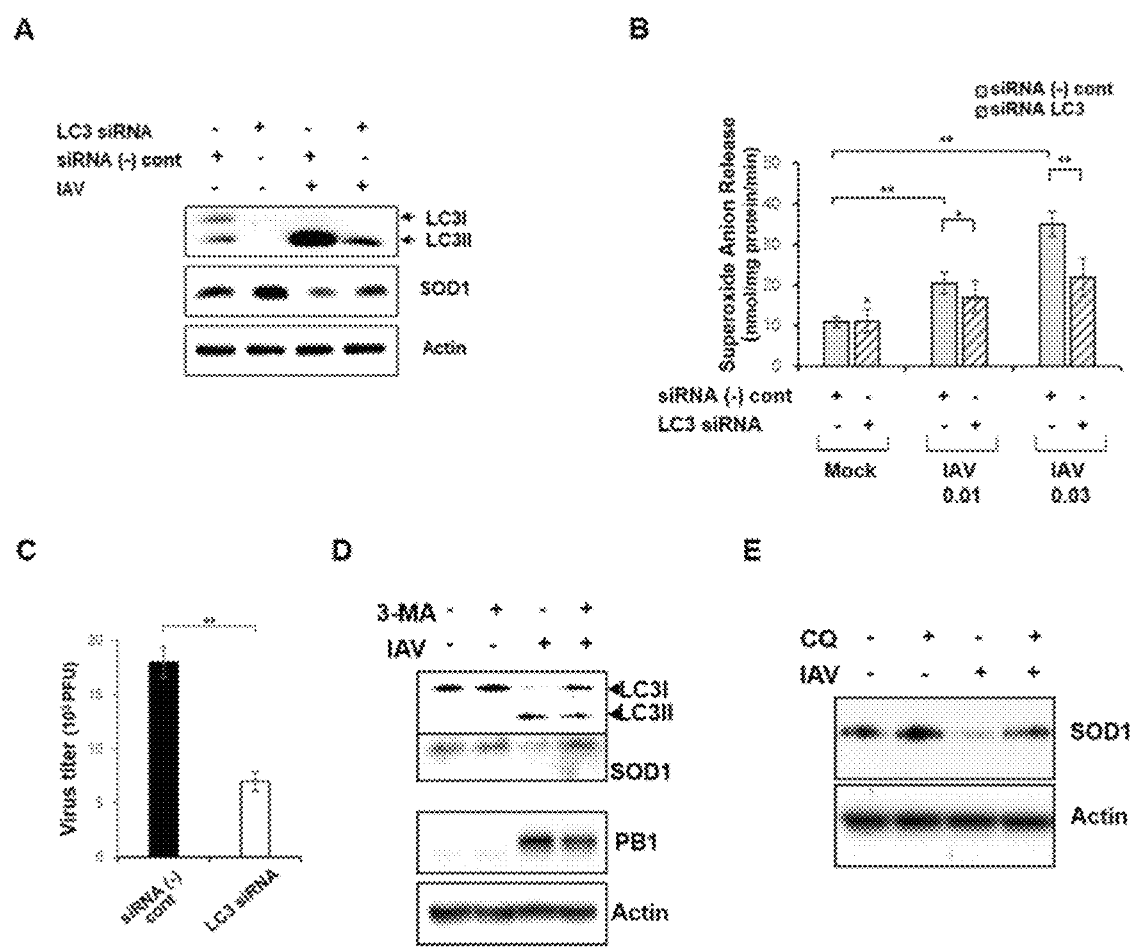
FIG. 3 shows that the activation of protein-degrading autophagy by IAV infection in vitro is one of the causes of decrease of SOD1 protein and increase of a viral titer. It has been shown that RNA interference of the LC3 gene, which plays an important role in activation of autophagy, or treatment with the autophagy inhibitor 3-methyladenine (3-MA) or chloroquine (chloroquine diphosphate) leads to inhibited decrease of SOD1 and reduces the replication ability of the virus. This means that the autophagy inhibitor 3-MA or chloroquine partially acts as an ROS production inhibitor by reducing the decrease of SOD1 protein and thus decreasing ROS.

Example 3. Decrease of SOD1 by Activation of Autophagy after Influenza Viral Infection and Effect of ROS Production Inhibitor as Autophagy Inhibitor It was confirmed that viral replication and infection rate (infectivity) can be regulated by ROS accumulation due to viral infection (Examples 1 and 2). As a mechanism of this phenomenon, it was investigated whether a virus decreases SOD1 protein in a host and whether it is related with the protein degradation function of autophagy. After infecting A549 cells with a virus, the LC3 gene which plays a major role in the activation of autophagy was silenced with siRNA 24 hours later, and then the degree of LC3 conversion and the amount of SOD1 protein were determined by western blotting. As a result, the LC3 conversion was increased significantly and the amount of the SOD1 protein was decreased significantly in the virus-infected cells. In contrast, the LC3 siRNA-treated group showed recovery of the amount of the SOD1 protein, which resulted in decreased ROS production and decreased viral titer (see FIGS. 3, A, B and C). From this result, it is thought that the activation of the cellular autophagy mechanism due to influenza viral infection results in decrease of the SOD1 protein and excessive accumulation of ROS, thereby contributing to viral proliferation.

In order to effectively regulate the mechanism of the activation of autophagy, the cells were treated with the autophagy inhibitor 3-MA or chloroquine. When the viral infection group was treated with 3-MA, decreased LC3 conversion and effectively inhibited autophagy were observed. At the same time, increase in the amount of SOD1 protein and decreased expression of viral protein PB1 were observed. The effect of chloroquine on SOD was more distinct than that of 3-MA (see FIGS. 3, D and E). Based on this experiment, it can be seen that the autophagy inhibitors 3-MA and chloroquine may be used as antiviral agents.

Figure 4:
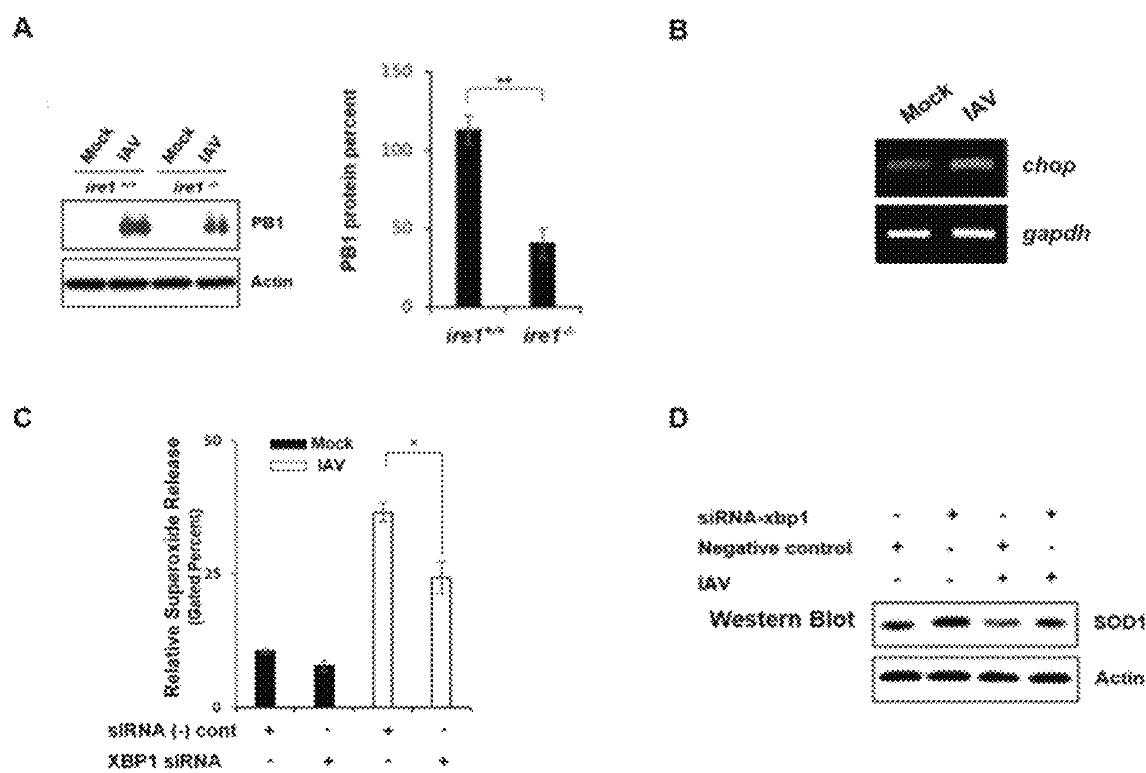
FIG. 4 shows that the increase in ROS production and the decrease of SOD1 due to IAV infection in vitro are affected by the activation of endoplasmic reticulum stress. The figure also shows that the activation of endoplasmic reticulum stress assists the proliferation of the virus and the inhibition of endoplasmic reticulum stress creates an environment unfavorable for the virus. It can be seen that the inhibition of endoplasmic reticulum stress has a greater effect on viral replication than the inhibition of autophagy although it may vary depending on the degree of viral infection.

Example 4. Relationship Between Decreased SOD1/Increased ROS and Activation of Endoplasmic Reticulum Stress in Influenza Viral Infection In order to investigate the relationship between influenza viral infection and the activation of endoplasmic reticulum stress, cells with the IRE1 (Inositol-requiring enzyme 1) gene deleted in the endoplasmic reticulum stress activation signaling pathway were infected with a virus and the expression level of the viral protein PB1 was measured. As a result, it was confirmed that the expression of PB1 was significantly decreased in the IRE1 gene-deleted cells as compared to other cells (see FIG. 4, A).

In order to reconfirm that the ROS production increased by viral infection is due to endoplasmic reticulum stress, A549 cells were infected with a virus and the expression level of Chop, which is an endoplasmic reticulum stress activation marker gene, was determined by RT-PCR 24 hours later. As a result, it was confirmed that the expression of the Chop gene was increased in the cells infected with influenza virus. This result means that the cellular endoplasmic reticulum stress mechanism is activated by influenza viral infection (see FIG. 4, B).

In addition, in order to investigate whether the ROS production increased by viral infection is due to endoplasmic reticulum stress, XBP1 which is a downstream gene of IRE1 in the endoplasmic reticulum stress activation signaling pathway was inactivated for 18 hours using siRNA immediately before viral infection. The cells with the endoplasmic reticulum stress activation mechanism blocked by XBP1 siRNA were infected with a virus and ROS were measured 24 hours later. As a result, the ROS production was decreased by about 30% or more as compared to a control group (negative siRNA) (see FIG. 4, C). From this result, it can be seen that influenza viral infection activates endoplasmic reticulum stress and the activation of endoplasmic reticulum stress is closely related with increased ROS production.

In addition, in order to investigate the change in the expression level of SOD1 in the relationship between the activation of endoplasmic reticulum stress and ROS production due to viral infection, the expression level of SOD1 was compared between cells with the endoplasmic reticulum stress activation mechanism blocked by siRNA and a control group (negative control). As a result, it was confirmed that the decrease in SOD1 expression was remarkably smaller in the virus-infected cells with the endoplasmic reticulum stress activation mechanism blocked as compared to the control group (see FIG. 4, D).

From these results, it can be concluded that influenza viral infection activates endoplasmic reticulum stress and the activation of endoplasmic reticulum stress induces decreased SOD1 expression and increased ROS production.

Example 5. Increase or Decrease of ROS in Animal Model Depending on Degree of Influenza Viral Infection and Effect of Administration of ROS Production Inhibitor or Scavenger It was shown in Examples 1 and 3 that endoplasmic reticulum stress is activated by influenza viral infection and the activation of endoplasmic reticulum stress leads to decreased SOD1 expression and increased ROS production in vitro. In order to investigate this effect in vivo, mice (C57BL/6N or BALB/c) were infected with influenza virus at 10 or 100 PFU (plaque-forming unit) and the amounts of SOD1 and ROS in lung tissue and viral titer were measured.

SOD1 is an enzyme present in the cytosol and acts in cells. In order to investigate whether SOD1 exhibits its function upon nasal administration, SOD1 was injected to the infected mice by intranasal spraying and the amounts of SOD1 and ROS in lung tissue were measured.

As a result, the accumulation of ROS in the bronchoalveolar lavage fluid (BALF) was increased and SOD1 expression in lung tissue was decreased as the viral PFU was higher. But, when SOD1 (50 units/mouse) was administered intranasally, the amount of ROS in the bronchoalveolar lavage fluid was decreased and the amount of SOD1 in lung tissue was recovered to a level close to that before the infection (see FIGS. 5, A and B).

Figure 5:
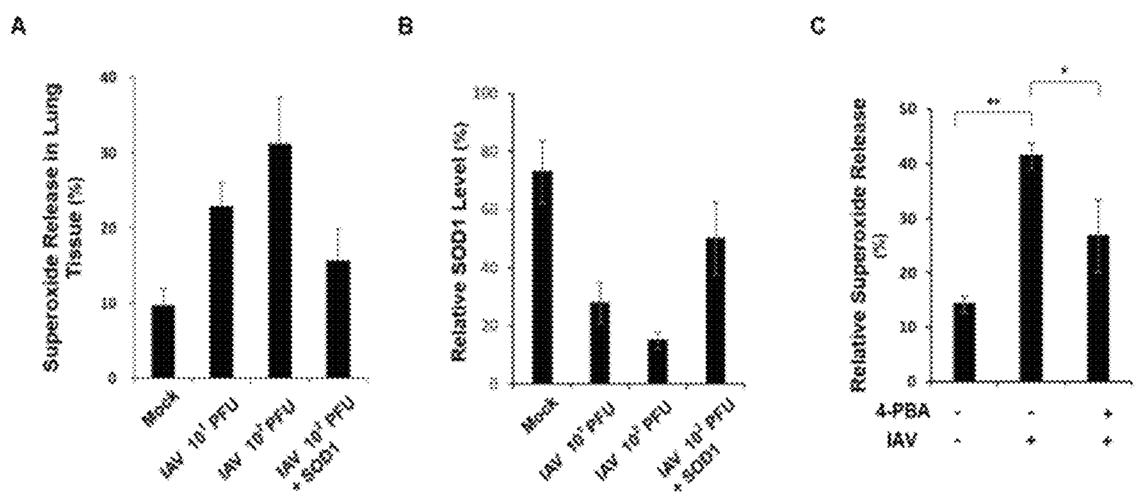
FIG. 5 shows that an increased titer during IAV infection in vivo leads to decreased SOD1 in lung tissue and increased ROS accumulation in a bronchoalveolar lavage fluid (BALF) and that nasal administration of SOD1 recovers the amount of SOD1 in lung tissue and reduces ROS accumulation in the BALF.

In addition, when 4-PBA (2.5 mg/mouse) was injected intranasally to the mice, the production of ROS was decreased significantly in the mice of the administration group as compared to a non-administration group (see FIG. 5, C).

Example 6. Analysis of ROS Production Inhibitor and Scavenger Affecting Viral Proliferation The effect of decreased ROS accumulation expected by ROS production inhibitor and scavenger on the proliferation of influenza virus was analyzed by measuring the survivability (body weight) of mice. First, in an acute test where mice were infected at 1,000 PFU, significant difference in body weight was observed between the mice to which 50 units/mouse of SOD1, 1 mg/mouse NAC or 2.5 mg/mouse 4-PBA was intranasally administered and the mice to which 50 units/mouse SOD1 and 50 units/mouse catalase were co-administered (see FIG. 6, A).

Figure 6:
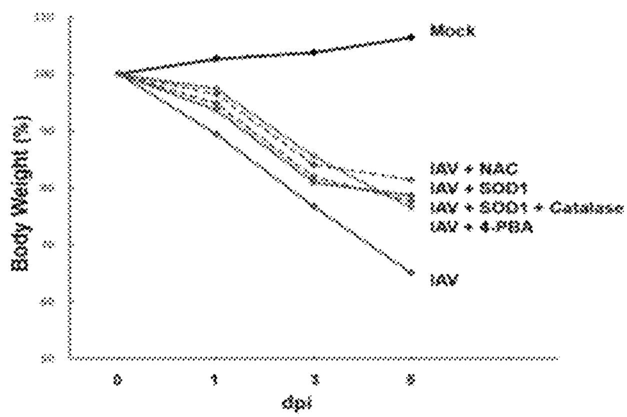
FIGS. 6A and 6B compare the effect of inhibiting viral proliferation and infection of nasal administration of an ROS production inhibitor and an ROS scavenger either alone or in combination in vivo by measuring the change in the body weight of mice. It was confirmed that an effect similar to that of treatment with an ROS production inhibitor (4-PBA) and an ROS scavenger (NAC) could be achieved by treatment with SOD1 alone. However, the effect was increased remarkably by co-treatment with 4-PBA and NAC as compared to treatment alone. In particular.
FIG. 6C shows that co-treatment of Vero E6 cells infected with 0.05 MOI of COVID-19-inducing severe acute respiratory syndrome coronavirus 2 (SARS-CoV-2) with NAC and 4-PBA results in antiviral effect of decreasing the genome copy number of the virus.
Figure 6:
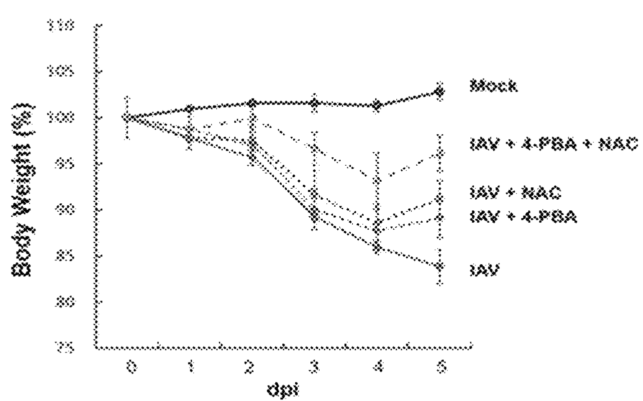
Figure 6:
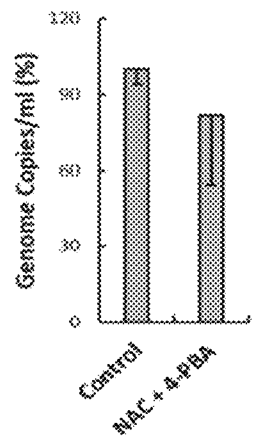
Figure 7:
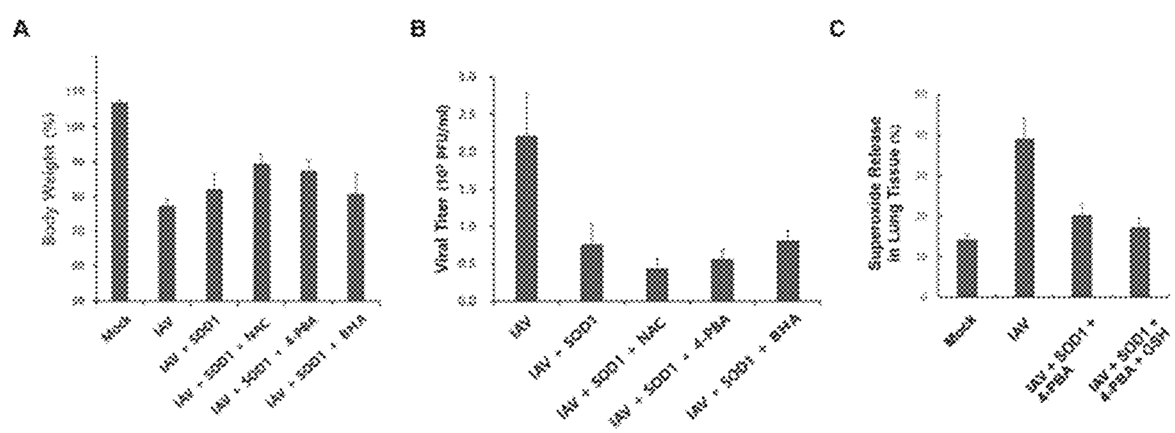
FIG. 7 shows a result of investigating the inhibition of viral proliferation and infection and decrease of viral titer by co-administering SOD1 and various ROS production inhibitors and ROS scavengers in vivo and measuring the change in the body weight of mice. It can also be seen that ROS accumulation in a bronchoalveolar lavage fluid due to IAV infection is decreased by the co-treatment.

In addition, when the synergistic effect of the co-administration of an ROS production inhibitor (4-PBA) and an ROS scavenger (NAC) that can be administered orally was investigated, higher synergistic effect was observed in the mice (infected at 200 PFU) to which 4-PBA and NAC were co-administered at doses of ⅓ of those described above as compared to when they were administered alone (see FIG. 6, B).

In order to investigate whether the co-administration also affects respiratory disease-causing viruses other than influenza, Vero cells were infected with 0.05 MOI of severe acute respiratory syndrome coronavirus 2 (SARS-CoV-2). It was confirmed that the co-treatment with NAC and 4-PBA for 48 hours exhibited antiviral effect of decreasing the genome copy number of the virus (see FIG. 6, C).

From this result, it can be seen that the accumulation of ROS is a result of viral infection and at the same time the necessary condition for viral infection and proliferation.

Example 7. Analysis of Synergistic Effect on Antiviral Activity by Combination of ROS Production Inhibitor and Scavenger The effect of the co-administration of SOD1 as an antiviral agent and other antioxidants on the decreased ROS production and viral infection was investigated. Specifically, mice (C57BL/6N) were infected with 1,000 PFU of influenza virus, and SOD1 and NAC, 4-PBA or BHA or NAC and 4-PBA were co-administered intranasally at the early stage of infection. Then, the change in the body weight and viral titer of the mice were compared with those of a control administration group.

As a result, significant change in body weight was observed on day 7 after the infection. There was an inversely proportional relationship between the change in body weight and the viral titer in lung tissue. The recovery of body weight of the infected mice was superior when SOD1 and NAC or 4-PBA were co-administered as compared to when SOD1 was administered alone. In addition, the viral titer was decreased significantly by about 3.7-4.4 times.

Figure 8:
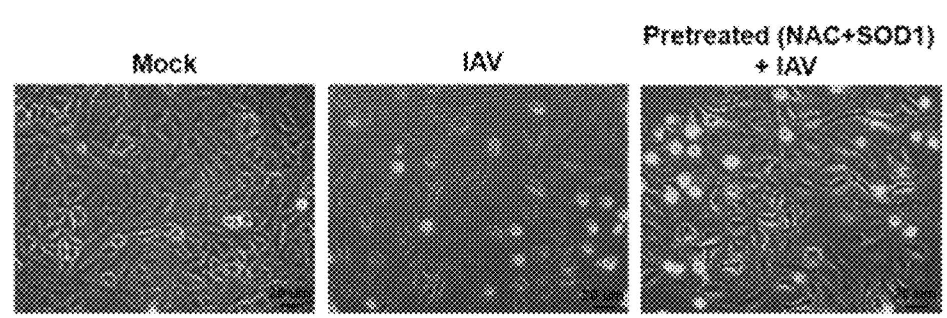
FIG. 8 compares the effect of inhibiting infection of treatment with 4-PBA, NAC and SOD1 in vitro and in vivo. In tissue culture, treatment with SOD1 and NAC prior to IAV infection reduced cell death. And, as a result of spraying a mixture solution of 4-PBA and NAC for 2 days twice a day prior to the infection in experiments with mice to investigate preventive effect for general transmission pathways (airborne infection such as droplet transmission, etc.), the spraying of the mixture solution for twice a day prior to the infection provided preventive effect for mild early infection.
Figure 8:
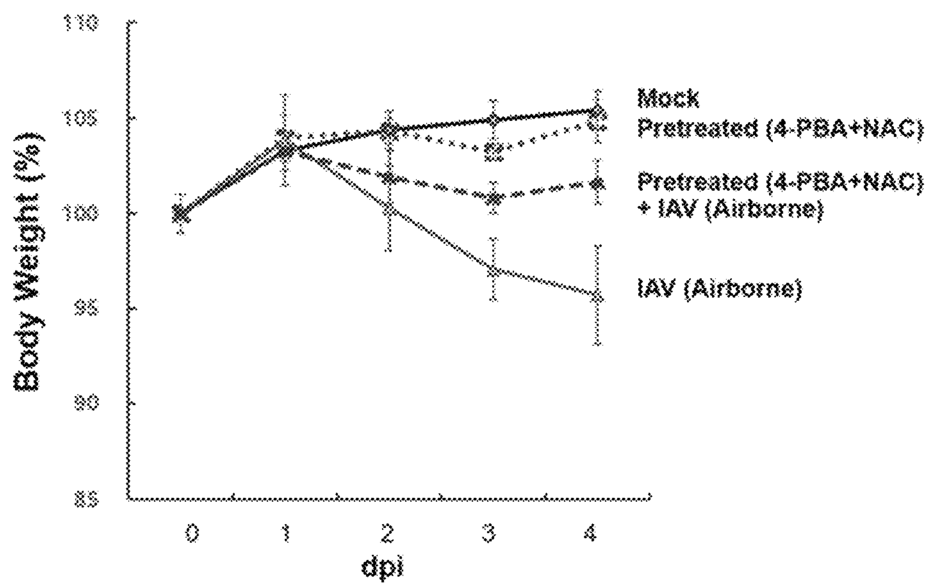
Figure 9:
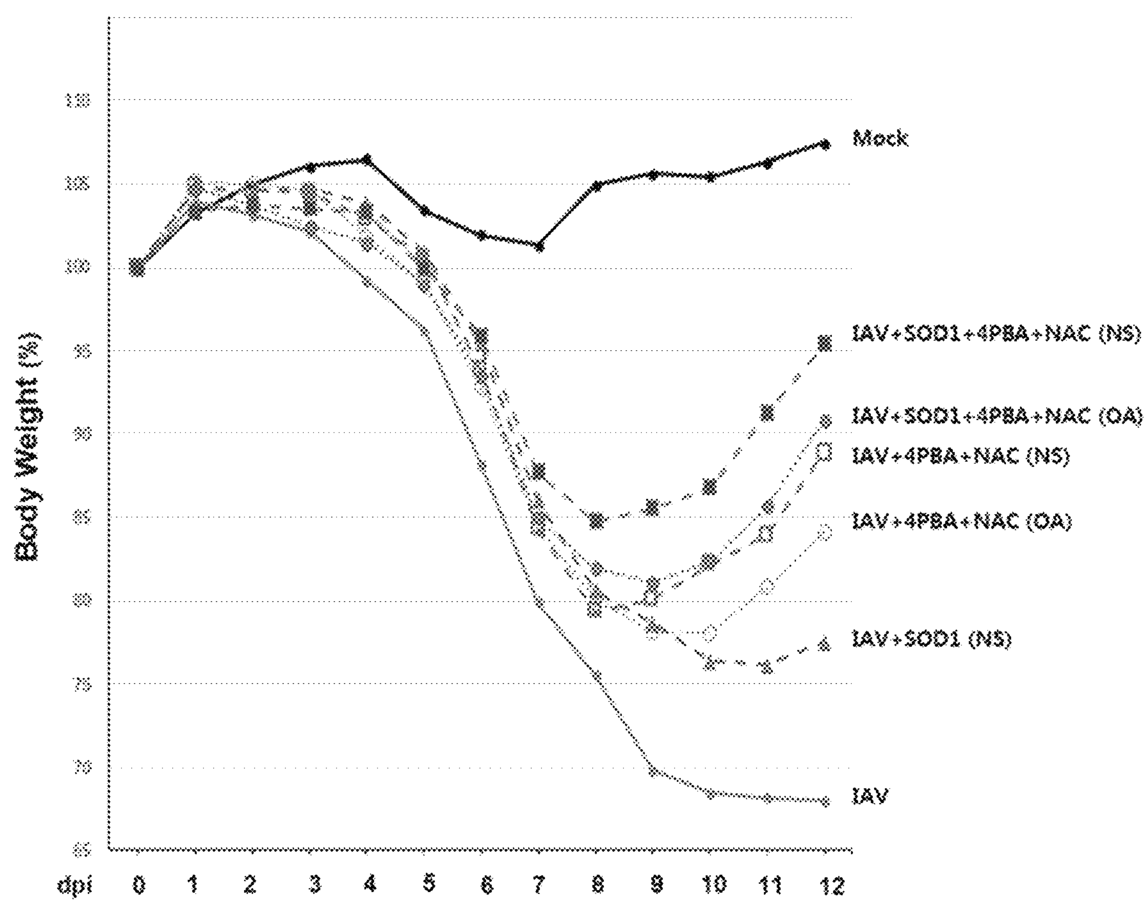
FIG. 9 shows a result of investigating the inhibitory effect against viral infection and therapeutic effect for host cells of the co-treatment of 4-PBA, NAC and SOD1 in vivo in the early stage of infection. It can be seen that the nasal administration (nasal spray, NS) of the complex agent provides better effect than oral administration (OA).
Figure 10:
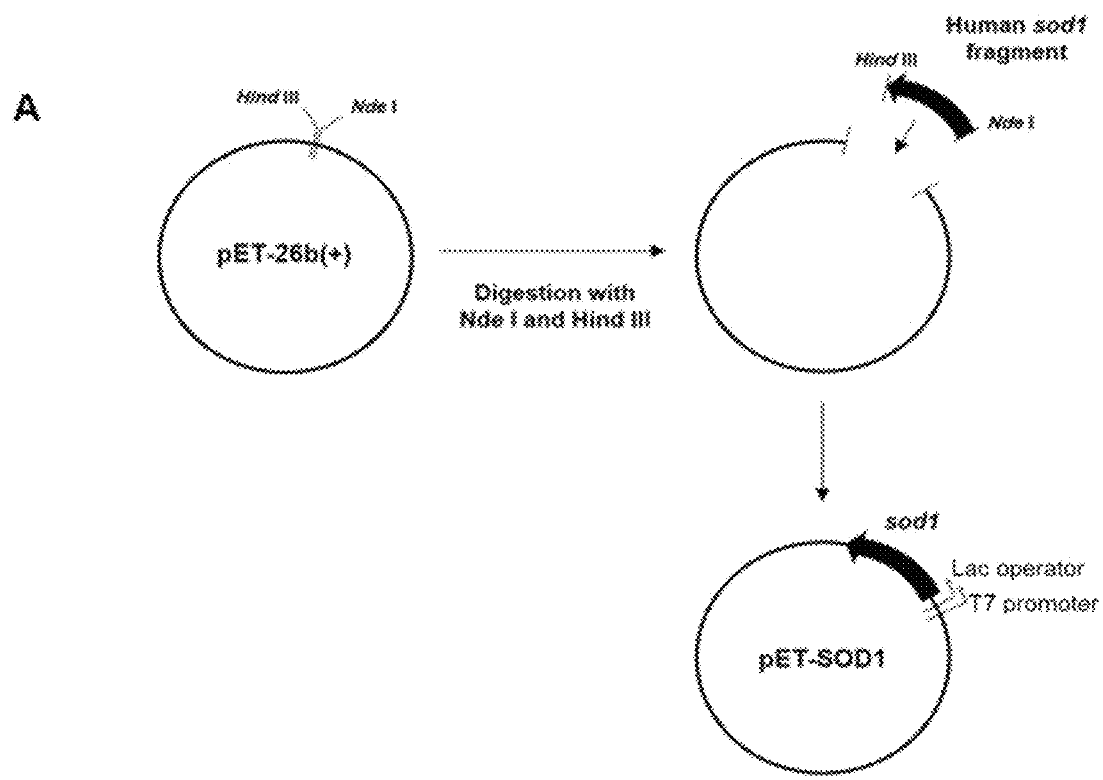
FIG. 10 illustrates the preparation of the bacterial expression vector pET-SOD1 for overexpression of SOD1 used as an ROS scavenger and shows a result of investigating the expression.
Figure 10:
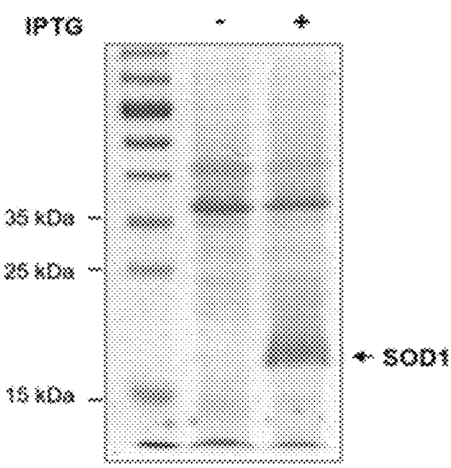

Example 8. Preventive Effect for Viral Infection Disease of Combination of ROS Production Inhibitor and Scavenger In this example, the effect of the co-administration of an ROS production inhibitor and an ROS scavenger on prevention of a viral infection disease was investigated. After treating A549 cells with SOD1 and NAC and then infecting them with IVA, the degree of cell death was observed. As a result, it was confirmed that the pretreatment with SOD1 and NAC significantly reduced the cell death caused by viral infection (see FIG. 8, A).

Then, in order to investigate the preventive effect of the general transmission pathway (airborne infection such as droplet transmission, etc.) in an animal experiment, a mixture solution of 4-PBA and NAC was intranasally sprayed into mice for 2 days, twice a day, prior to infection. It was confirmed that the administration of the composition exhibited the preventive effect of inhibiting viral proliferation at the early stage of infection (see FIG. 8, B).

Example 9. Synergistic Effect and Therapeutic Effect for Viral Infection Disease of Combination of ROS Production Inhibitor and Scavenger In general, infection with 200 PFU or higher of IAV leads to rapid increase in ROS production from the early stage and thus significantly affects viral replication and infection rate. Therefore, in this example, mice were infected with 60 PFU of IAV, rather than 200 PFU, and the preventive and therapeutic effects for a viral infection disease were investigated under a droplet transmission condition after treating with a complex agent. It was investigated whether viral infection and proliferation are inhibited by co-treatment with the ROS production inhibitor 4-PBA and the ROS scavenger NAC in the absence or presence of SOD1. As a result, SOD1 showed significant synergistic effect when co-administered with the ROS production inhibitor and the ROS scavenger. It was also confirmed that the nasal administration (nasal spray, NS) of the complex agent of the ROS production inhibitor and the ROS scavenge was more effective in preventing or treating a viral infection disease than oral administration (OA).

Although the specific exemplary embodiments of the present disclosure have been described in detail, it will be obvious to those having ordinary knowledge in the art that the foregoing description merely illustrates specific exemplary embodiments and the scope of the present disclosure is not limited by them. Therefore, the substantial scope of the present disclosure is defined by the appended claims and their equivalents.

INDUSTRIAL APPLICABILITY

The present disclosure relates to a pharmaceutical composition for preventing or treating a viral infection disease, etc., which contains a complex of a reactive oxygen species production inhibitor and a reactive oxygen species scavenger as an active ingredient. The composition of the present disclosure can be used as a global infection inhibitor and therapeutic agent as a limited alternative to vaccines that must be newly developed every year due to the emergence of viral mutations.

The invention claimed is:

1. A method for administering a composition comprising an ROS production inhibitor and an ROS scavenger to a subject in need of preventing or treating a viral infection disease, wherein the ROS scavenger is one or more selected from the group consisting of N-acetylcysteine (NAC) and superoxide dismutase 1 (SOD1), wherein the ROS production inhibitor prevents virus infection-mediated ROS production by inhibiting activation of ROS production, and wherein the ROS scavenger eliminates produced ROS.

2. The method of claim 1, wherein the ROS production inhibitor is 4-phenylbutyrate (4-PBA), and wherein the ROS scavenger is superoxide dismutase 1 (SOD1) and N-acetylcysteine (NAC), wherein N-acetylcysteine (NAC) is administered at a dosage of 1 mg or less per unit body weight (20 g) of the subject.

3. The method of claim 1, wherein the ROS scavenger is superoxide dismutase 1 (SOD1) and N-acetylcysteine (NAC).

4. The method of claim 1, wherein the viral infection disease is caused by one or more virus selected from the group consisting of influenza A virus, human immunodeficiency virus and coronavirus.

5. The method of claim 1, the composition is administered via nasal route or oral route.

* * * * *